(12) United States Patent
LaCasse-Jobin et al.

(10) Patent No.: US 10,220,903 B2
(45) Date of Patent: Mar. 5, 2019

(54) ADJUSTABLE FOOTREST FOR A VEHICLE

(71) Applicant: BOMBARDIER RECREATIONAL PRODUCTS INC., Valcourt (CA)

(72) Inventors: Pierre LaCasse-Jobin, Magog (CA); Martin Ferland, Granby (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 266 days.

(21) Appl. No.: 15/100,481

(22) PCT Filed: Nov. 28, 2014

(86) PCT No.: PCT/IB2014/066436
§ 371 (c)(1),
(2) Date: May 31, 2016

(87) PCT Pub. No.: WO2015/079427
PCT Pub. Date: Jun. 4, 2015

(65) Prior Publication Data
US 2016/0297493 A1    Oct. 13, 2016

Related U.S. Application Data

(60) Provisional application No. 61/910,237, filed on Nov. 29, 2013.

(51) Int. Cl.
*B62J 25/00*       (2006.01)
*B62K 5/027*      (2013.01)
(Continued)

(52) U.S. Cl.
CPC ............... *B62J 25/00* (2013.01); *B62J 1/00* (2013.01); *B62K 5/027* (2013.01); *B62K 5/05* (2013.01);
(Continued)

(58) Field of Classification Search
CPC .... B62J 1/00; B62J 25/00; B62K 5/05; B62K 5/027; B62K 11/02; B62K 17/00;
(Continued)

(56) References Cited

U.S. PATENT DOCUMENTS 4,546,993 A    10/1985  Walker
5,458,213 A    10/1995  Nakaya et al.
(Continued)

FOREIGN PATENT DOCUMENTS

CN    1235917 A    11/1999
CN    1607156 A     4/2005
(Continued)

OTHER PUBLICATIONS

International Search Report with regard to PCT/IB2014/066436 dated Mar. 18, 2015.
(Continued)

*Primary Examiner* — Joseph M Rocca
*Assistant Examiner* — Felicia L. Brittman
(74) *Attorney, Agent, or Firm* — BCF LLP

(57) ABSTRACT

A vehicle has a frame defining a longitudinal centerplane, at least one front wheel and at least one rear wheel, an engine operatively connected to at least one of the wheels, a transmission, a brake assembly operatively connected to at least one of the wheels, and a straddle-type seat. Left and right rails disposed vertically lower than the seat extend forwardly and downwardly on a left and right side respectively of the longitudinal centerplane. A left footrest connected to the left rail is selectively disposed in one of at least a first and a second left footrest position. A right footrest connected to the right rail is selectively disposed in one of at least a first and a second right footrest position. A foot-operated actuator is connected to one of the left and right footrests. The actuator is operatively connected to one of: the brake assembly and the transmission.

19 Claims, 34 Drawing Sheets

(51) Int. Cl.
*B62J 1/00* (2006.01)
*B62K 5/05* (2013.01)
*B62K 11/02* (2006.01)
*B62K 21/02* (2006.01)
*B62K 21/12* (2006.01)
*B62K 21/26* (2006.01)
*B62K 23/08* (2006.01)
*B62M 17/00* (2006.01)

(52) U.S. Cl.
CPC .............. *B62K 11/02* (2013.01); *B62K 21/02* (2013.01); *B62K 21/12* (2013.01); *B62K 21/26* (2013.01); *B62K 23/08* (2013.01); *B62M 17/00* (2013.01)

(58) Field of Classification Search
CPC ........ B62K 21/02; B62K 21/12; B62K 21/26; B62K 23/08
USPC ........................................ 280/291
See application file for complete search history.

(56) References Cited

U.S. PATENT DOCUMENTS

| | | | |
|---|---|---|---|
| 7,040,442 | B2 | 5/2006 | McWhorter |
| 7,264,255 | B1 | 9/2007 | Winfrey |
| 7,467,682 | B1 * | 12/2008 | Hahm ................... B62K 23/08 180/219 |
| 7,757,583 | B1 | 7/2010 | Reading |
| 7,823,900 | B2 | 11/2010 | Warren |
| 7,832,516 | B2 | 11/2010 | Bagnariol |
| 2004/0035626 | A1 | 2/2004 | Girouard et al. |
| 2005/0194199 | A1 | 9/2005 | Marks et al. |
| 2005/0236203 | A1 * | 10/2005 | Toftner ................... B62J 1/12 180/219 |
| 2005/0263335 | A1 | 12/2005 | McWhorter |
| 2006/0144628 | A1 * | 7/2006 | McWhorter ........... B62K 23/08 180/219 |
| 2008/0023242 | A1 * | 1/2008 | Lachapelle .............. B62J 15/00 180/210 |
| 2016/0023706 | A1 | 1/2016 | Chang et al. |

FOREIGN PATENT DOCUMENTS

| | | | | |
|---|---|---|---|---|
| EP | 0424918 | A1 | 5/1991 | |
| EP | 1382521 | A1 | 1/2004 | |
| FR | 2921625 | A1 * | 4/2009 | ............ B62J 25/00 |
| FR | 2921625 | A1 | 4/2009 | |
| JP | S60199785 | A | 10/1985 | |
| JP | 1081280 | A | 3/1998 | |

OTHER PUBLICATIONS

English Translation of the Abstract of FR2921625 retrieved on Espacenet on May 27, 2016.
Supplementary European Report with regard to the counterpar EP Patent Application No. 14866598 dated Nov. 28, 2017.
English Translation of the Description and Claims of JP Patent Application No. S60199785 retrieved on Espacenet on Jan. 9, 2018.
Chinese Search Report of Corresponding Application No. 2014800677104; dated May 15, 2018.
English Machine translation of JPH1081280A retrieved from http://translationportal.epo.org/ on Jul. 16, 2018.
English Machine translation of CN1235917A retrieved from http://translationportal.epo.org/ on Jul. 16, 2018.
English Abstract of CN1607156A retrieved from https://worldwide.espacenet.com/ on Jul. 16, 2018.

* cited by examiner

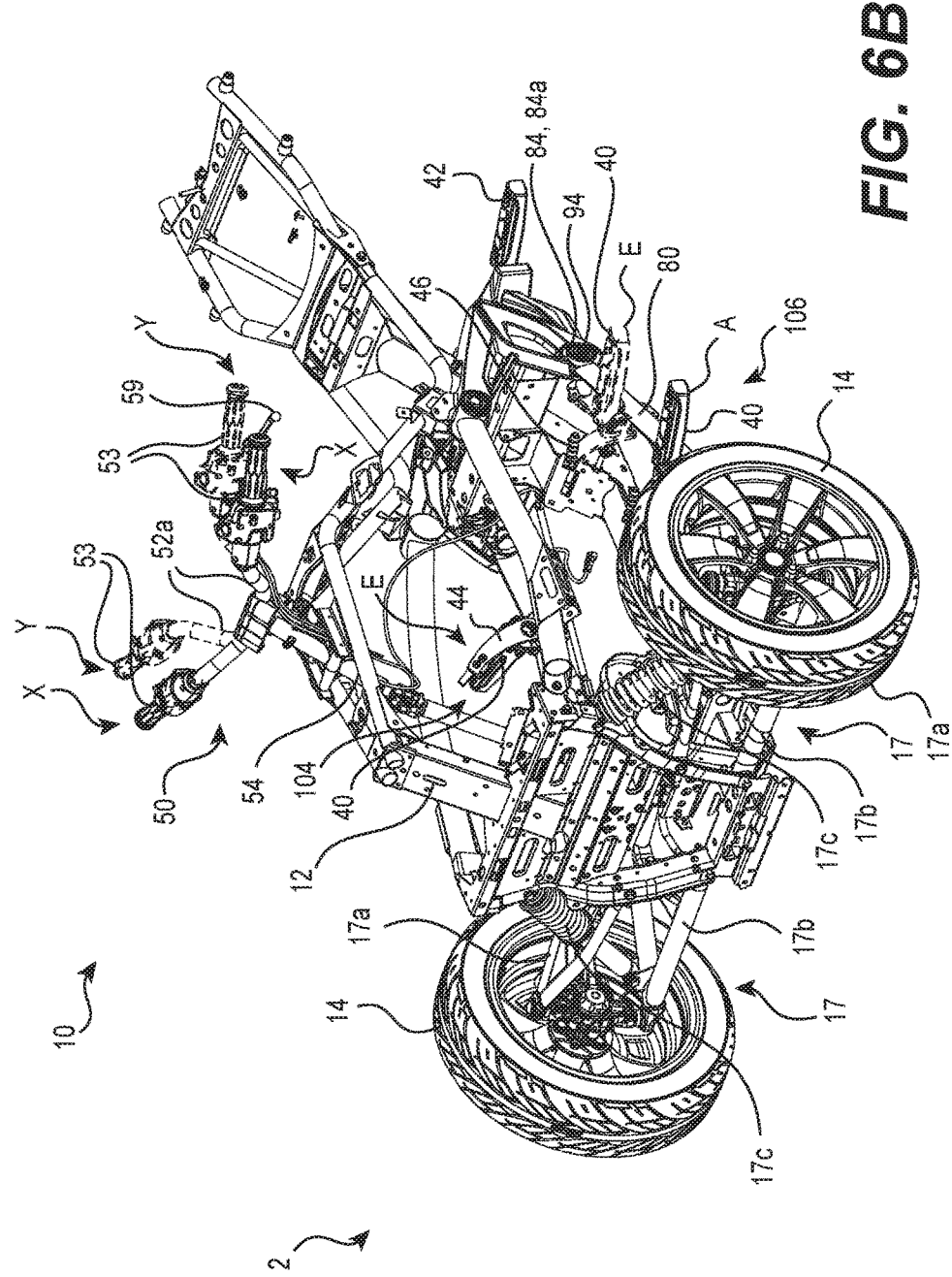

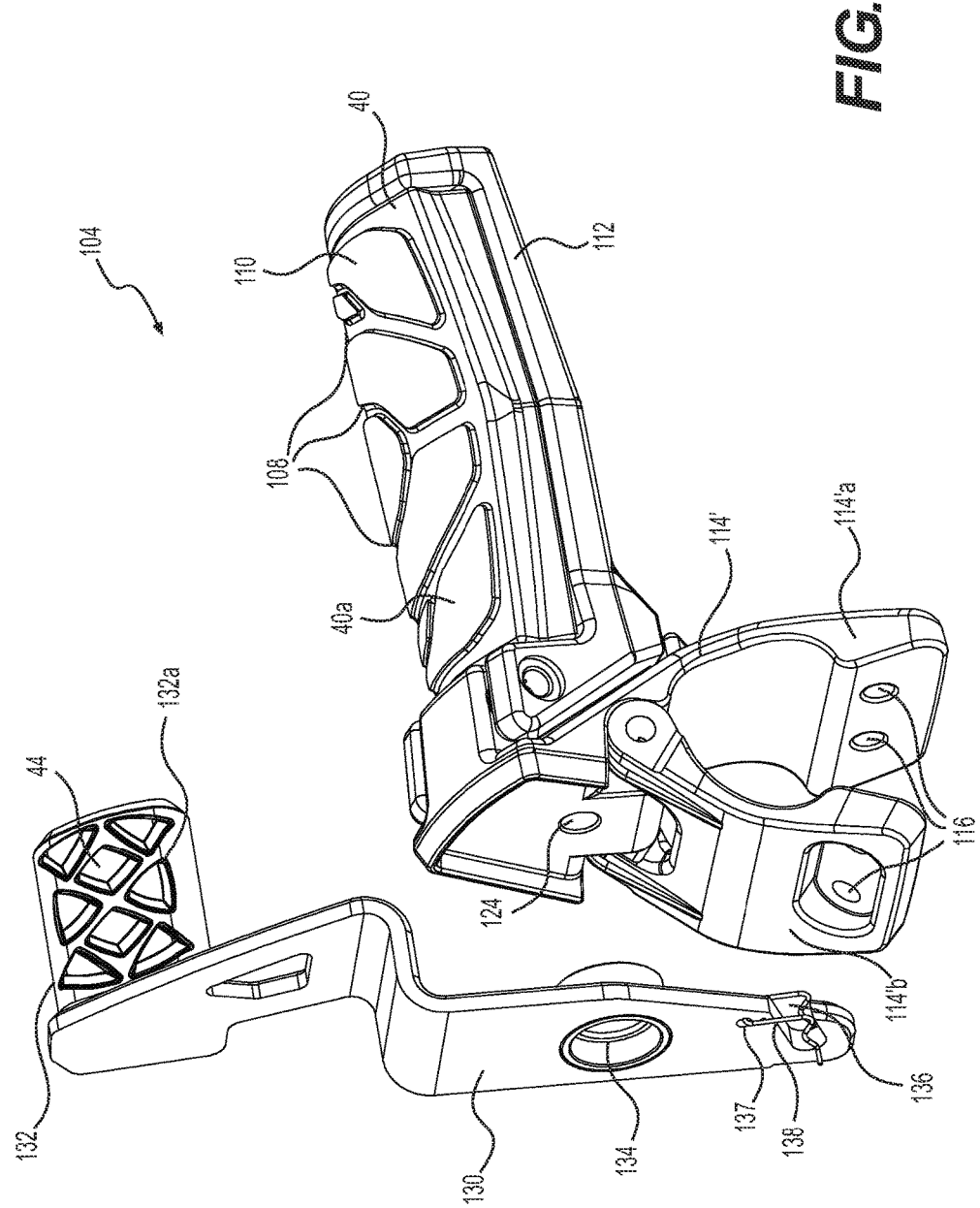

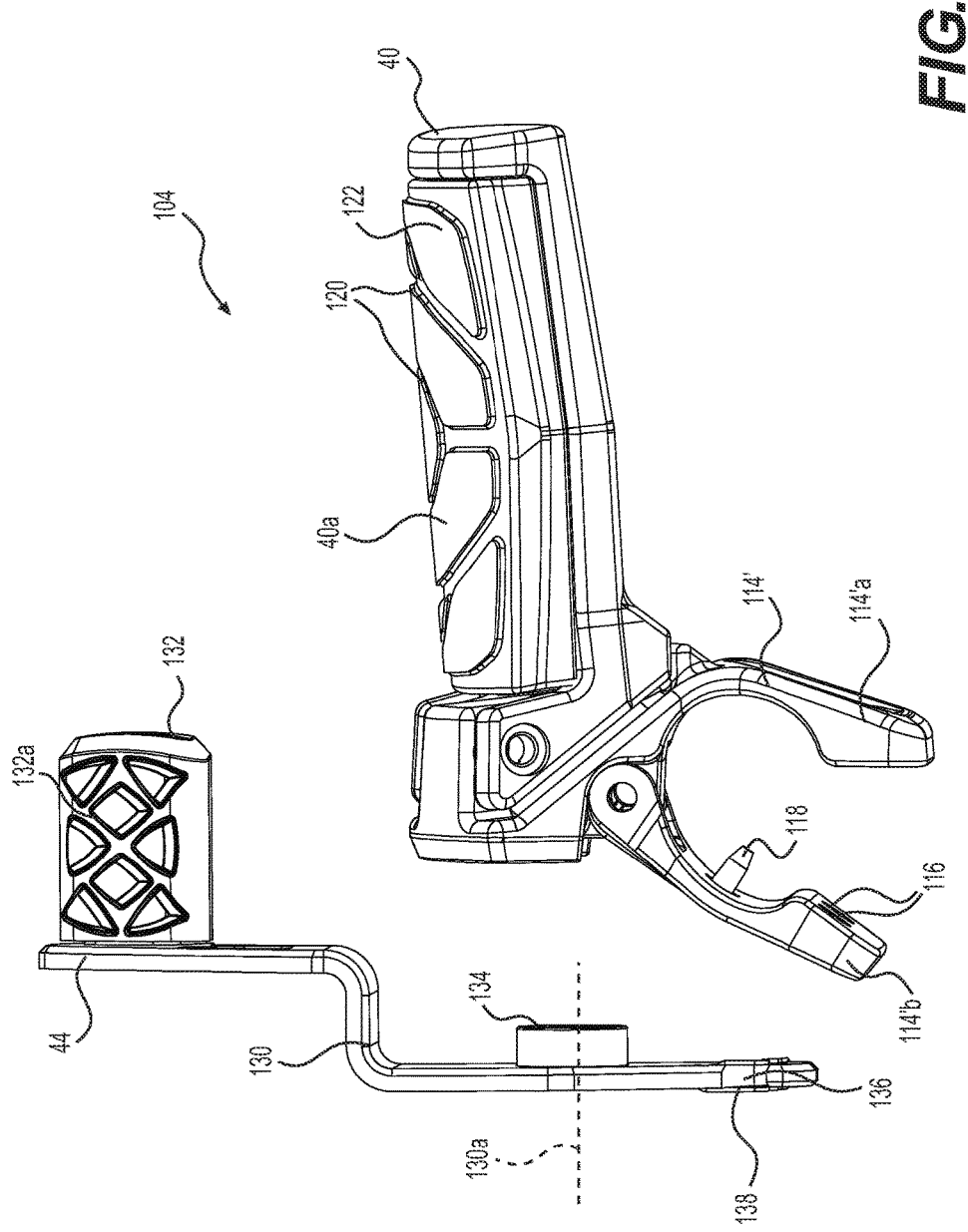

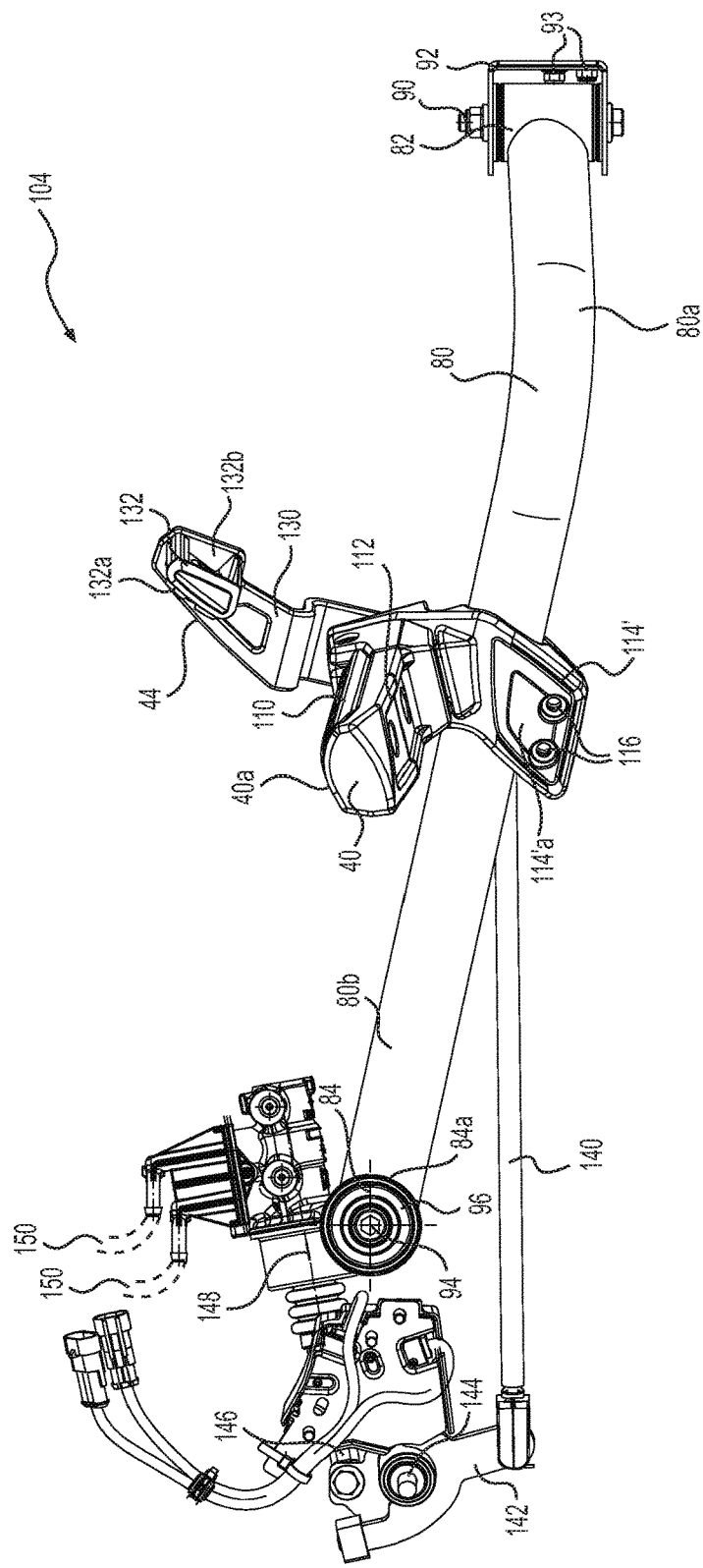

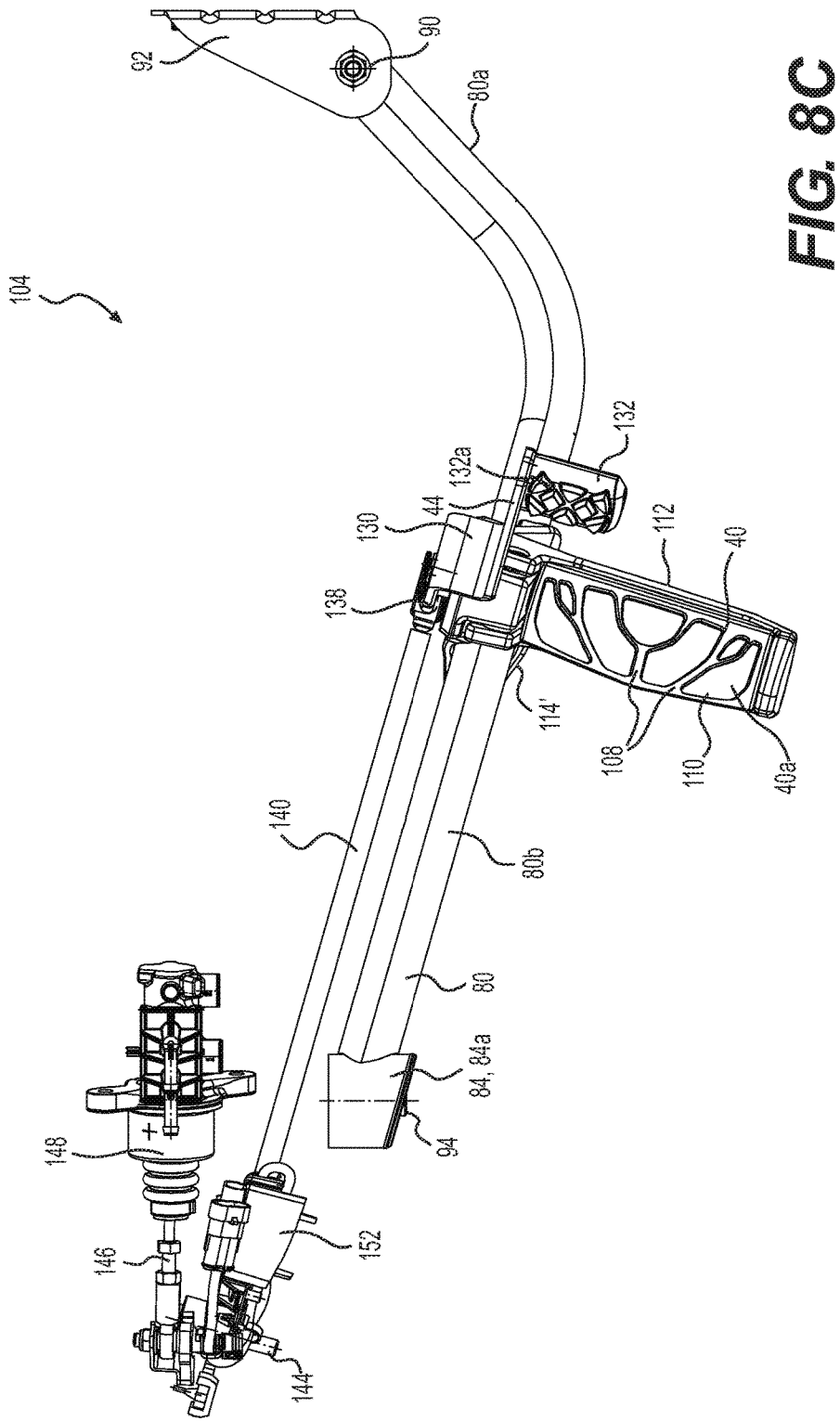

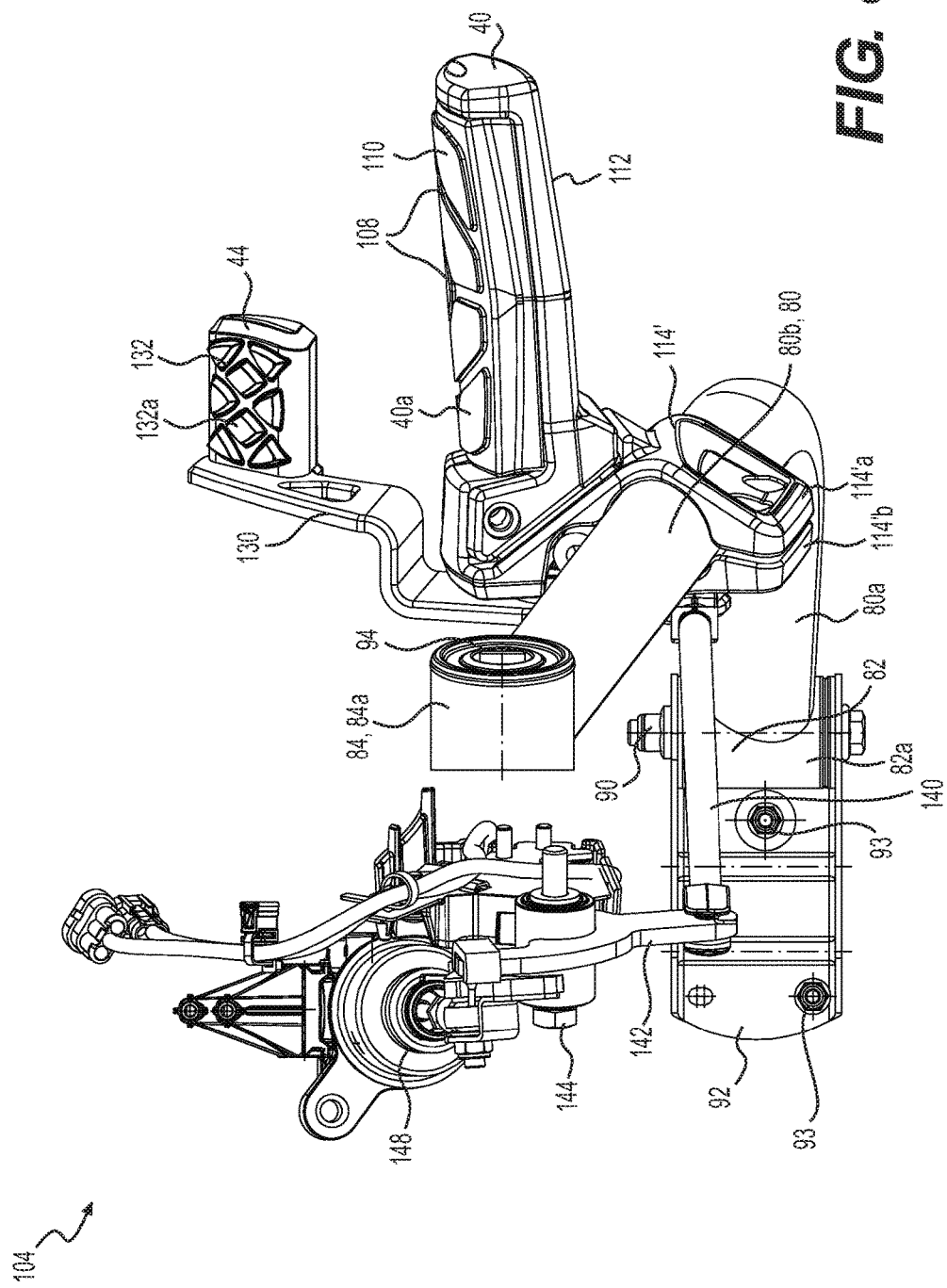

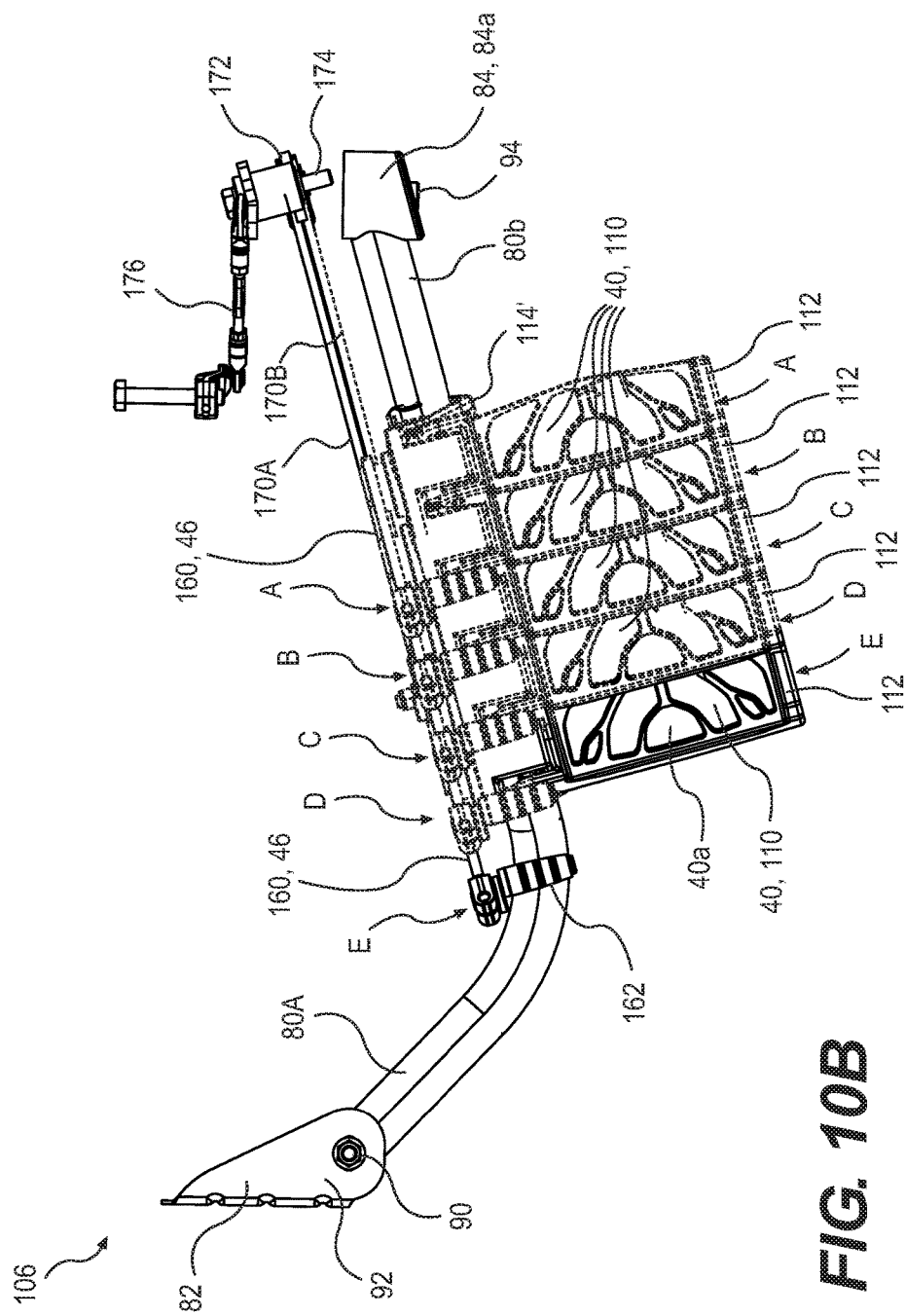

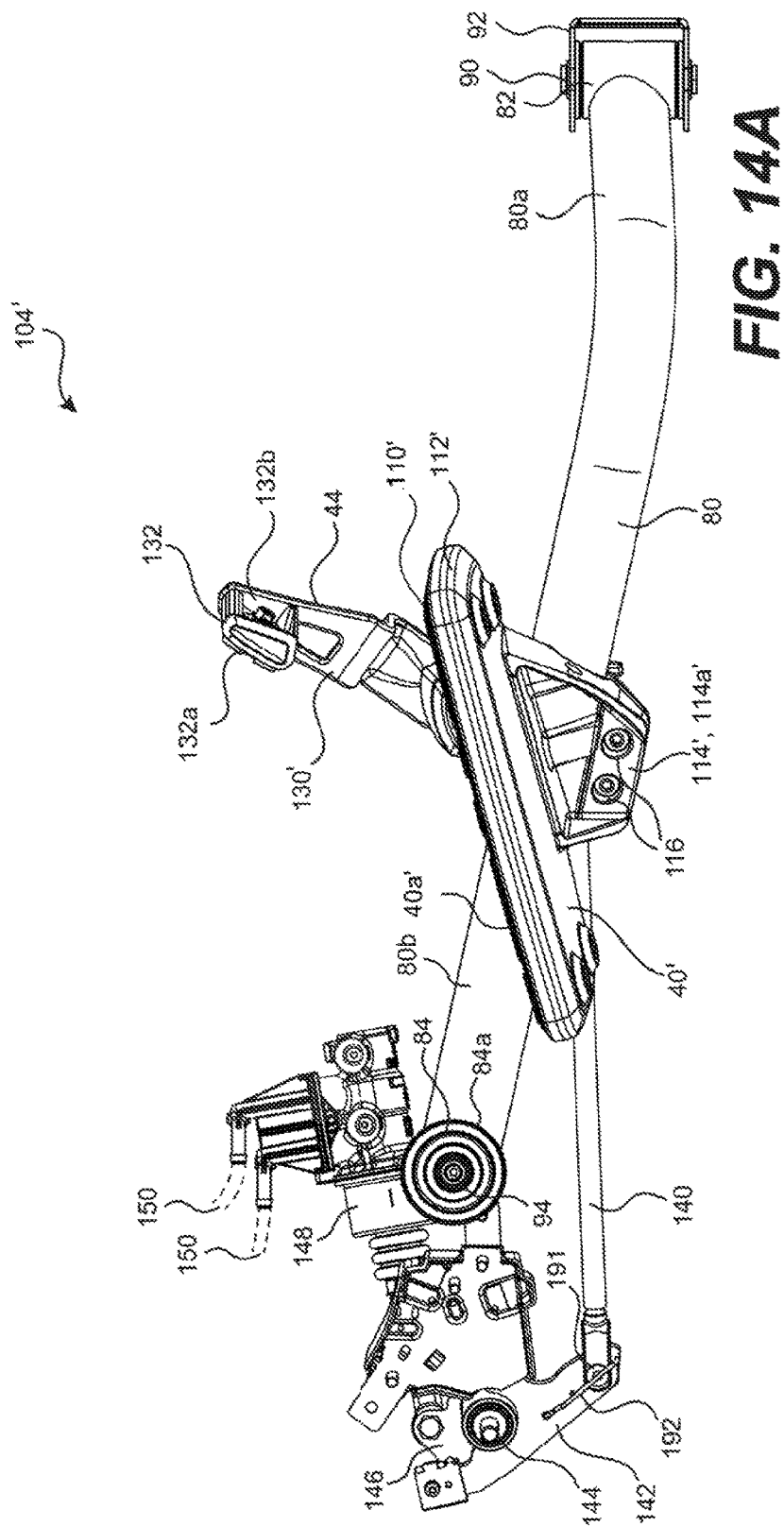

ADJUSTABLE FOOTREST FOR A VEHICLE

CROSS-REFERENCE

The present application claims priority to U.S. Provisional Patent Application No. 61/910,237, filed on Nov. 29, 2013, the entirety of which is incorporated herein by reference.

FIELD OF THE TECHNOLOGY

The present technology relates to footrests for vehicles.

BACKGROUND

Wheeled straddle-seat vehicles are provided with driver footrests on each side of the vehicle vertically below the seat to support the feet of the driver. The footrests may be in the form of footpegs or footboards, and are typically rigidly fixed to the vehicle frame. A foot-actuated brake lever may be provided near one of the footrests so that the driver can actuate the brakes with the foot without removing the foot from the footrest. In straddle-seat vehicles with manual or semi-automatic transmissions, a foot-operated gear shift lever may be provided near the other footrest so that the driver can change gears. As a vehicle may be driven by different drivers, it is desirable to have the ability to adjust the position of the driver footrests to accommodate drivers of different sizes and/or according to the driver's preferences.

SUMMARY

It is an object of the present technology to ameliorate at least some of the inconveniences mentioned above.

According to one aspect of the present technology, there is provided a vehicle including a frame defining a longitudinal centerplane of the vehicle, at least one front wheel connected to the frame and at least one rear wheel connected to the frame. An engine is supported by the frame and operatively connected to at least one of the wheels. A transmission operatively connects the engine to the at least one of the wheels. A brake assembly is operatively connected to at least one of the wheels. A straddle-type seat is connected to the frame. A left rail is connected to the frame and disposed vertically lower than the seat. The left rail extends forwardly and downwardly on a left side of the longitudinal centerplane. A right rail is connected to the frame and disposed vertically lower than the seat. The right rail extends forwardly and downwardly on a right side of the longitudinal centerplane. A left footrest is connected to the left rail and selectively disposed in one of at least a first left footrest position and a second left footrest position. A right footrest is connected to the right rail and selectively disposed in one of at least a first right footrest position and a second right footrest position. A foot-operated actuator is connected to one of the left footrest and the right footrest, the actuator being operatively connected to one of: the brake assembly and the transmission.

In some implementations, the left rail extends forwardly, downwardly and leftwardly, and the right rail extends forwardly, downwardly and rightwardly.

In some implementations, the left rail is connected to the frame forwardly of the left footrest and rearwardly of the left footrest in each of the first and second left footrest positions. The right rail is connected to the frame forwardly of the right footrest and rearwardly of the right footrest in each of the first and second right footrest positions.

In some implementations, a front end of the left rail is disposed vertically lower than a rear end thereof, and a front end of the right rail is disposed vertically lower than a rear end thereof.

In some implementations, a front end of the left rail is disposed laterally outwardly of a rear end thereof, and a front end of the right rail is disposed laterally outwardly of a rear end thereof.

In some implementations, the left rail and the right rail are connected to the frame below the rotation plane. The rotation plane contains respective rotation axes of at least one of the at least front wheel and at least one of the at least one rear wheel.

In some implementations, in each of the first and second left footrest positions, the left footrest extends leftwardly from the left rail and in each of the first and second right footrest positions, the right footrest extends rightwardly from the right rail.

In some implementations, each of the left and right footrests is a footpeg.

In some implementations, the actuator is a brake actuator operatively connected to the brake assembly and connected to one of the left and right footrests. A foot-operated gear shift actuator is operatively connected to the transmission, the gear shift actuator being connected to the other of the left and right footrests.

In some implementations, the left footrest is slidable along the left rail between the first and second left footrest positions and the right footrest is slidable along the right rail between the first and second right footrest positions.

In some implementations, the left footrest is displaced forwardly from the first left footrest position to the second left footrest position and the right footrest is displaced forwardly from the first right footrest position to the second right footrest position.

In some implementations, the left footrest is displaced leftwardly from the first left footrest position to the second left footrest position and the right footrest is displaced rightwardly from the first right footrest position to the second right footrest position.

In some implementations, the left footrest is displaced downwardly from the first left footrest position to the second left footrest position and the right footrest is displaced downwardly from the first right footrest position to the second right footrest position.

In some implementations, the left footrest is displaced forwardly, leftwardly and downwardly from the first left footrest position to the second left footrest position and the right footrest is displaced forwardly, rightwardly and downwardly from the first right footrest position to the second right footrest position.

In some implementations, a portion of the left footrest is disposed above a rotation plane in the first left footrest position and below the rotation plane in the second left footrest position. A portion of the right footrest is disposed above the rotation plane in the first right footrest position and below the rotation plane in the second right footrest position. The rotation plane contains respective rotation axes of at least one of the at least front wheel and at least one of the at least one rear wheel.

In some implementations, a steering assembly has a steering column rotatably connected to the frame and operatively connected to at least one of the wheels for steering the vehicle. A handlebar is connected to the steering column and selectively disposed in one of at least a first handlebar position and a second handlebar position. The handlebar including a left grip and a right grip. Each of the left and right grips is displaced longitudinally forwardly from the first handlebar position to the second handlebar position.

In some implementations, when the handlebar is steered in a straight-ahead direction, in the first handlebar position, at least a portion of the left grip is disposed longitudinally rearward of the left footrest in the first and the second left footrest positions and at least a portion of the right grip is disposed longitudinally rearward of the right footrest in the first and the second right footrest positions. In the second handlebar position, at least a portion of the left grip is disposed longitudinally forward of the left footrest in the first left footrest position and longitudinally rearward of the left footrest in the second left footrest position, and at least a portion of the right grip is disposed longitudinally forward of the right footrest in the first right footrest position and longitudinally rearward of the right footrest in the second right footrest position.

In some implementations, the engine has a crankshaft. The left and right footrests are disposed longitudinally rearward of the crankshaft in at least one of the first and second footrest positions.

In some implementations, the transmission has a transmission output shaft operatively connected to at least one of the wheels. The left footrest is disposed longitudinally forward of the transmission output shaft in at least one of first and second left footrest positions. The right footrest is disposed longitudinally forward of the transmission output shaft in at least one of the first and second right footrest positions.

In some implementations, the at least one front wheel includes a left front wheel and a right front wheel. When the vehicle is steered in a straight-ahead direction, the left and right footrests are each disposed laterally inwardly of a center of the respective left and right front wheels.

In some implementations, the at least one front wheel includes a left front wheel and a right front wheel. When the vehicle is steered in a straight-ahead direction, the left footrest is disposed laterally between the longitudinal centerplane and the left front wheel. The right footrest is disposed laterally between the longitudinal centerplane and the right front wheel.

In some implementations, the at least one front wheel includes a left front wheel and a right front wheel. When the vehicle is steered in a straight-ahead direction, a front end of the left rail is disposed laterally inwardly of the left front wheel. A front end of the right rail is disposed laterally inwardly of the right front wheel.

In some implementations, the front end of the left rail is disposed longitudinally between a front edge and a rear edge of the left front wheel. The front end of the right rail is disposed longitudinally between a front edge and a rear edge of the right front wheel.

In some implementations, the left footrest disposed in the first left footrest position is longitudinally aligned with the right footrest in the first right footrest position. The left footrest disposed in the second left footrest position is longitudinally aligned with the right footrest disposed in the second right footrest position.

In some implementations, a plurality of linkage rods is included for connecting the actuator to the one of the brake assembly and the transmission. The plurality of linkage rods including at least a first linkage rod connecting the actuator to the one of the brake assembly and the transmission when the one of the left footrest and the right footrest is disposed in the corresponding one of the first left footrest position and first right footrest position and a second linkage rod linkage rod connecting the actuator to the one of the brake assembly and the transmission when the one of the left footrest and the right footrest is disposed in the corresponding one of the second left footrest position and second right footrest position.

In some implementations, a left passenger footrest and a right passenger footrest are connected to the frame. The left passenger footrest is disposed longitudinally rearwardly and vertically higher than the left rail. The right passenger footrest is disposed longitudinally rearwardly and vertically higher than the right rail.

For the purpose of this application, terms related to spatial orientation such as downwardly, rearwardly, forward, front, rear, left, right, above and below are as they would normally be understood by a driver of the vehicle sitting thereon in an upright position with the vehicle in a straight ahead orientation (i.e. not steered left or right), and in an upright position (i.e. not tilted).

Implementations of the present vehicle each have at least one of the above-mentioned object and/or aspects, but do not necessarily have all of them. It should be understood that some aspects of the present vehicle that have resulted from attempting to attain the above-mentioned object may not satisfy this object and/or may satisfy other objects not specifically recited herein.

Additional and/or alternative features, aspects, and advantages of implementations of the present vehicle will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 6B is a perspective view, taken from a front left side, of the vehicle portion of FIG. 6A;

FIG. 7A is a partially exploded perspective view, taken from a rear, left side, of the footrest and brake actuator of the right footrest assembly of the vehicle of FIG. 1;

FIG. 7B is a partially exploded rear elevation view of the footrest and brake actuator of FIG. 7A;

FIG. 8A is a right side elevation view of the right footrest assembly mounted to the right rail of the vehicle of FIG. 1;

FIG. 8C is a top plan view of the right footrest assembly and right rail of FIG. 8A;

FIG. 8E is a rear elevation view of the right footrest assembly and right rail of FIG. 8A;

FIG. 10B is a top plan view of the left footrest assembly in various positions and left rail of FIG. 10A;

FIG. 14A is a right side elevation view of the right footrest assembly of FIG. 13 mounted to the right rail of the vehicle of FIG. 1;

DETAILED DESCRIPTION

Figure 1:
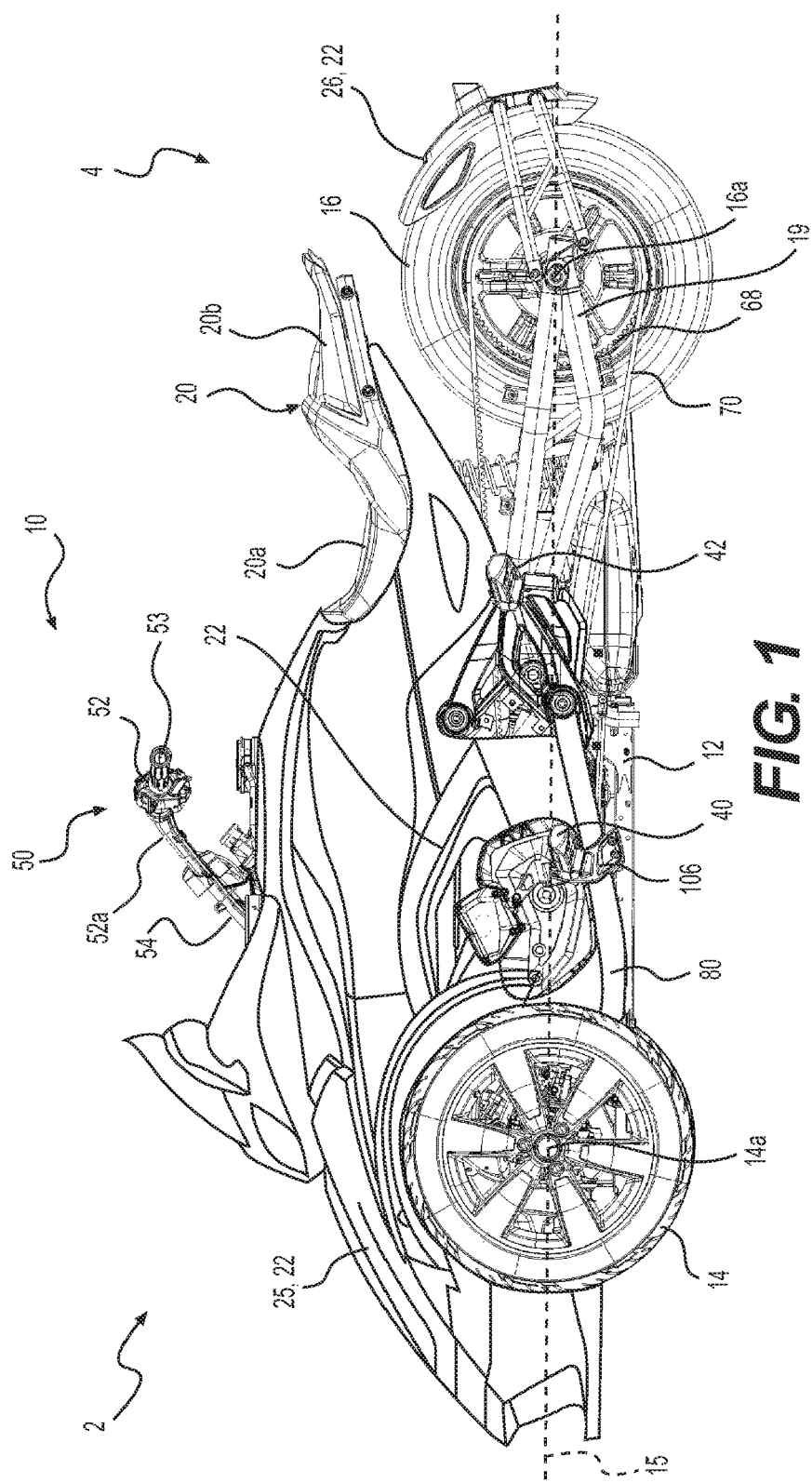
FIG. 1 is a left side elevation view of a three-wheel straddle-type vehicle.

The present description is provided with respect to a three-wheel straddle-type vehicle 10. However, it should be understood that other types of straddle-type vehicles such as, for example, motorcycles, and three- or four-wheel all-terrain vehicles are also contemplated.

With reference to FIGS. 1 to 6D, a vehicle 10 has a front portion 2 and a rear portion 4 defined consistently with the forward travel direction of the vehicle 10. The vehicle 10 has a frame 12 which defines a longitudinal centerplane 7.

The vehicle 10 is a three-wheel vehicle 10 including a left front wheel 14, a right front wheel 14 and a single rear wheel 16. It is however contemplated that the vehicle 10 could have more than one rear wheel 16. The left and right front wheels 14 and the rear wheel 16 each have a tire secured thereto. It is contemplated that the front wheels 14 or the rear wheel 16 could have more than one tire secured thereto. The front wheels 14 are equally offset from the longitudinal centerplane 7 in the lateral direction, and the rear wheel 16 is centered with the longitudinal centerplane 7. The front wheels 14 rotate about a rotation axis 14a. The rear wheel 16 rotates about a rotation axis 16a. In the illustrated implementation of the vehicle 10, each of the rotation axes 14a, 16a of the wheels 14, 16 is disposed horizontally. A common plane 15 containing the rotation axes 14a, 16a of the wheels 14, 16, when the vehicle is placed on level ground and without a driver, passenger, or any cargo loaded thereon, is referred to herein as a rotation plane 15. It is contemplated that each of the rotation axes 14a of the front wheels 14 could be disposed at an angle with respect to the horizontal, and therefore not disposed in a common horizontal plane 15. In this case, the rotation plane 15 is defined as a plane perpendicular to the longitudinal centerplane 7 and passing through the centers of the wheels 14, 16.

The vehicle 10 is a straddle-type vehicle having a straddle seat 20 disposed along the longitudinal centerplane 7 and supported by the frame 12. The straddle seat 20, adapted to accommodate two adult-sized riders, includes a forward seat portion 20a for the driver and a rear seat portion 20b for a passenger. The second portion 20b is higher than the first portion 20a. It is contemplated that the three-wheel vehicle 10 could not have the rear seat portion 20b.

Figure 2:
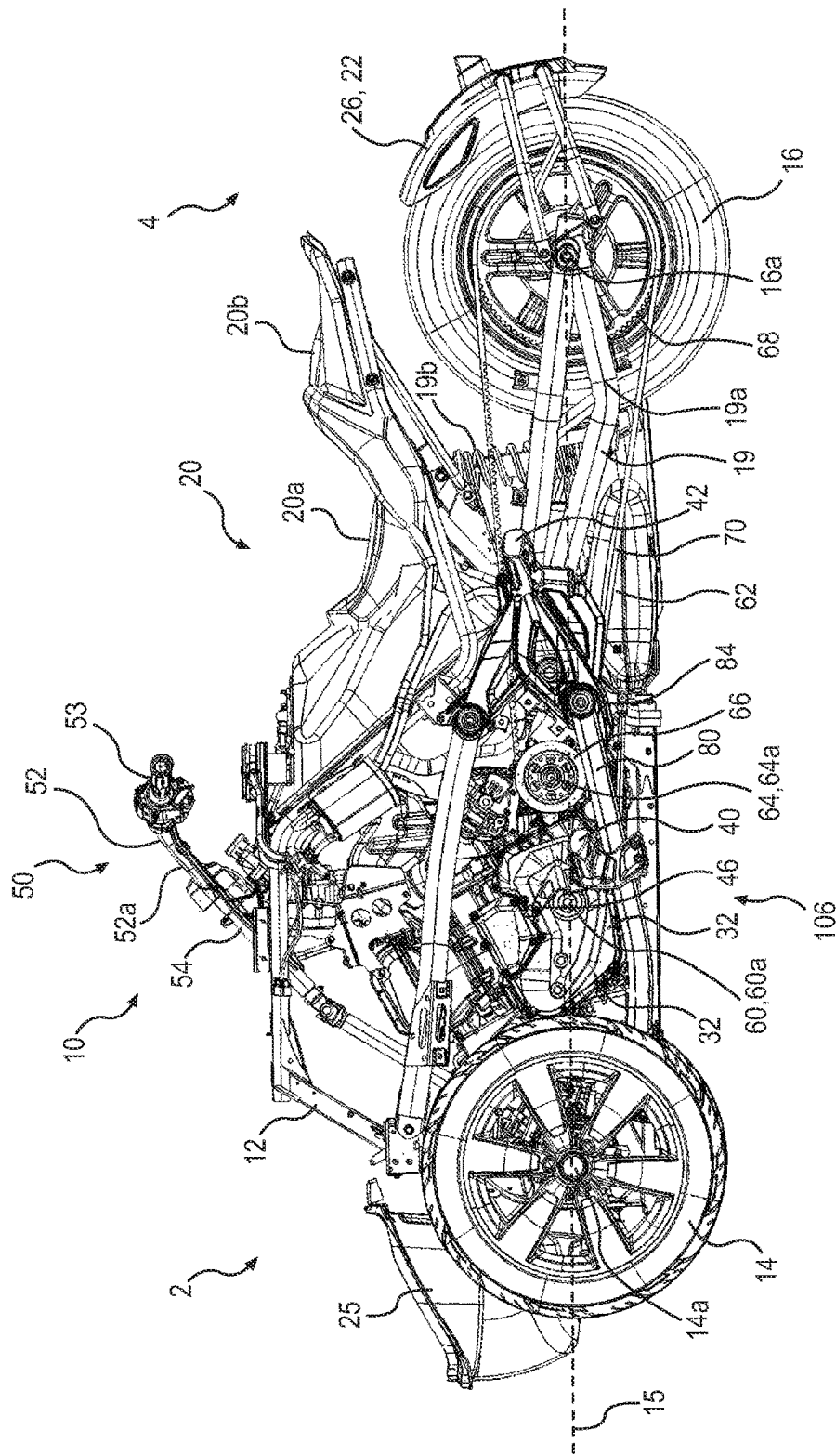
FIG. 2 is a left side elevation view of the vehicle of FIG. 1 with some of the fairings removed to show the internal components of the vehicle.

With reference to FIG. 2, the frame 12 supports and houses a motor 32 located vertically below the straddle seat 20 and longitudinally rearward of the front wheels 14. In the illustrated implementation of the vehicle 10, the motor 32 is in the form of an internal combustion engine. It is however contemplated that the motor 32 could be other than an internal combustion engine. For example, the motor 32 could be an electric motor, a hybrid or the like. The motor 32 will be referred to hereinafter as engine 32 for convenience. The engine 32 is an inline three-cylinder four-stroke internal combustion engine in the illustrated implementation of the vehicle 10, but it is contemplated that other types of internal combustion engines could be used. The engine 32 is operatively connected to the rear wheel 16 to drive the rear wheel 16. It is contemplated that the engine 32 could be connected to the front wheels 14 instead of, or in addition to, the rear wheel 16. The engine 32 has a crankshaft 60 which rotates about a crankshaft axis 60a disposed normal to the longitudinal centerplane 7. The rear wheel 16 is operatively connected to the crankshaft 60 through a transmission 62. The transmission 62 includes a transmission output shaft 64 operatively connected to the engine 32 via one of a plurality of gears (not shown). The transmission output shaft 64 rotates about a transmission output shaft axis 64a disposed normal to the longitudinal centerplane 7. A transmission sprocket 66 is mounted to the transmission output shaft 64. A wheel sprocket 68 is mounted to the hub of the rear wheel 16 on the left side thereof. A belt 70 is disposed about the wheel sprocket 68 and the transmission sprocket 66 to transmit power from the engine 32 to the wheel sprocket 68. The wheel sprocket 68 rotates the rear wheel 16 to propel the vehicle 10 along the ground. It is contemplated that the engine 32 could be connected to the wheel sprocket 68 via a continuously variable transmission (CVT) instead of, in addition to, the transmission 62.

With reference to FIGS. 1 and 2, fairings 22 are connected to the frame 12 to enclose and protect the internal components of the three-wheel vehicle 10 such as the engine 32. The fairings 22 include a hood 24 disposed at the front of the vehicle 10 between the front wheels 14. The hood 24 is pivotably connected to the frame 12 and can be disposed in an open position to provide access to a storage bin 25 disposed under the hood 24. The fairings 22 also include a rear deflector 26 disposed over the rear wheel 16 to protect the driver and/or passenger from dirt and water which can be lifted by the wheel 16 while it is rolling.

As can be seen in FIGS. 4 and 6A to 6D, each front wheel 14 is mounted to the frame 12 of the vehicle 10 via a front suspension assembly 17. In the illustrated implementation, the front suspension assembly 17 is a double A-arm type suspension, also known as a wishbone suspension. Each front suspension assembly 17 includes an upper A-arm 17a, a lower A-arm 17b and a shock absorber 17c. It is contemplated that other types of suspensions, such as a McPherson suspension, could be used.

Figure 4:
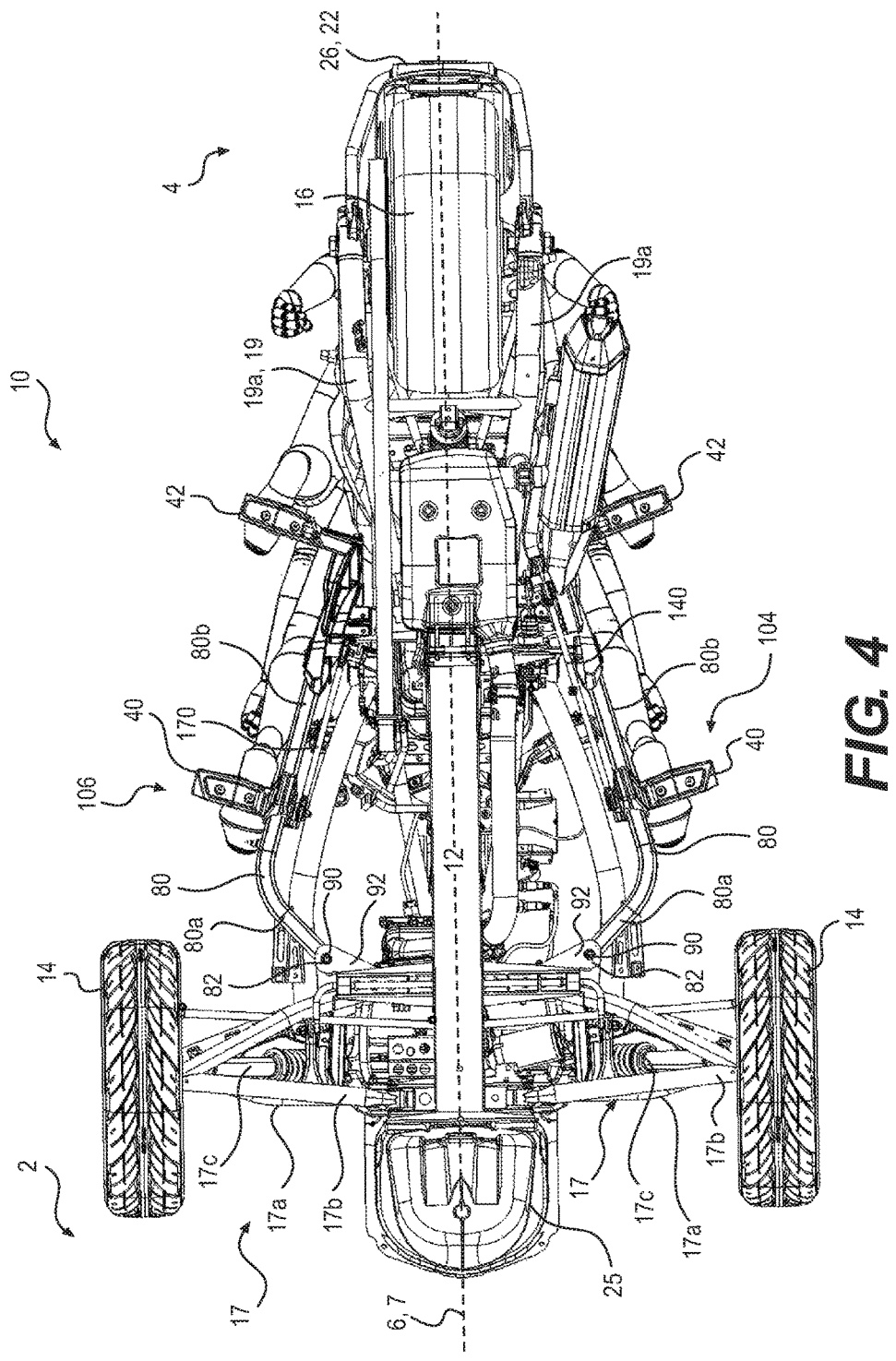
FIG. 4 is a bottom plan view of the vehicle of FIG. 2 with a driver and a passenger seated thereon.

As can be seen in FIGS. 1, 2 and 4, the rear wheel 16 is connected to the frame 12 by a rear suspension assembly 19. The rear suspension assembly 19 includes a swing arm 19a and a shock absorber 19b. The swing arm 19a has two arms pivotally mounted at a front thereof to the frame 12. The rear wheel 16 is rotatably mounted between the rear ends of the two arms. The shock absorber 19b is connected between the swing arm 19a and the frame 12.

Figure 5A:
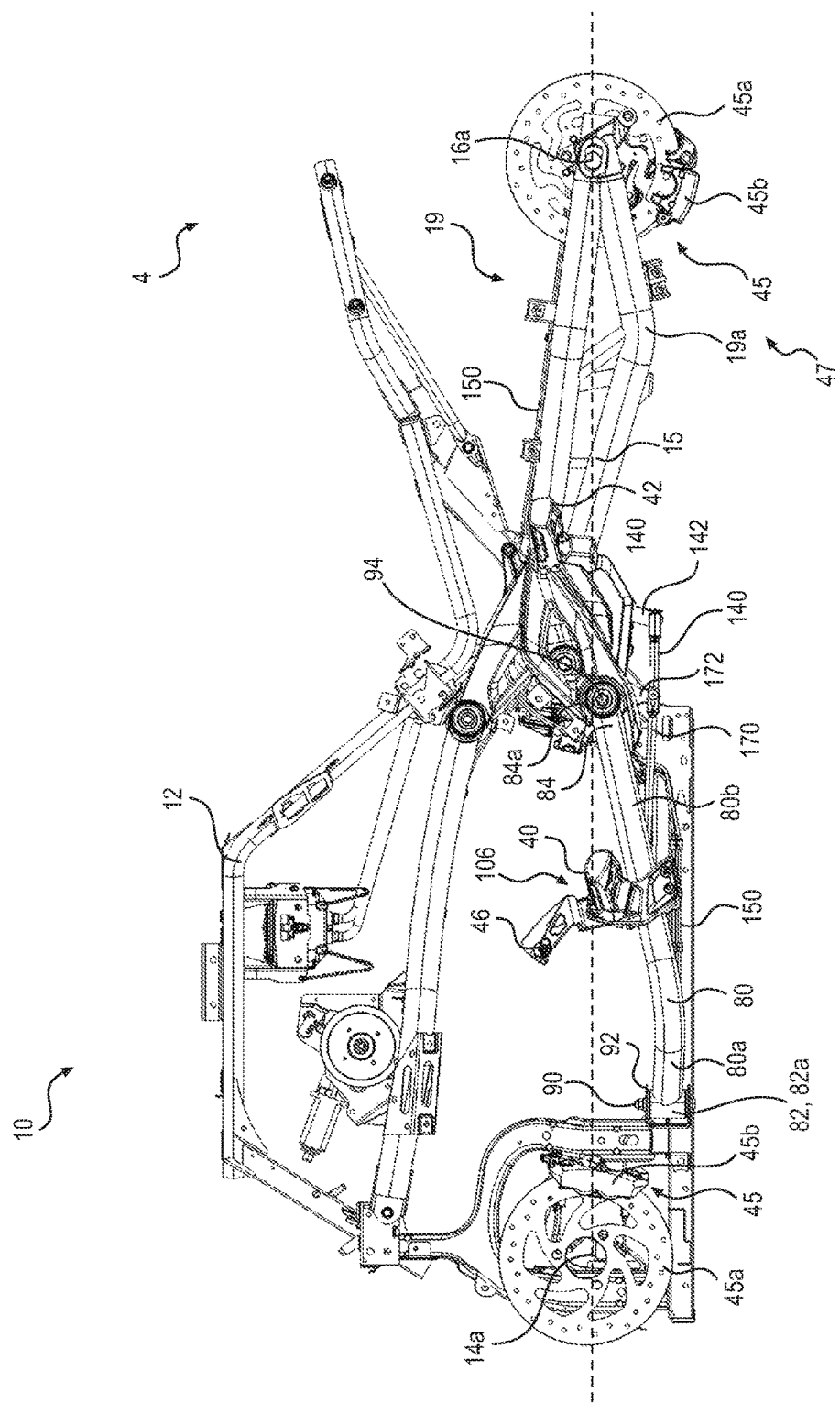
FIG. 5A is a left side elevation view of the frame, brake assembly and footrest assemblies of the vehicle of FIG. 1.
Figure 5B:
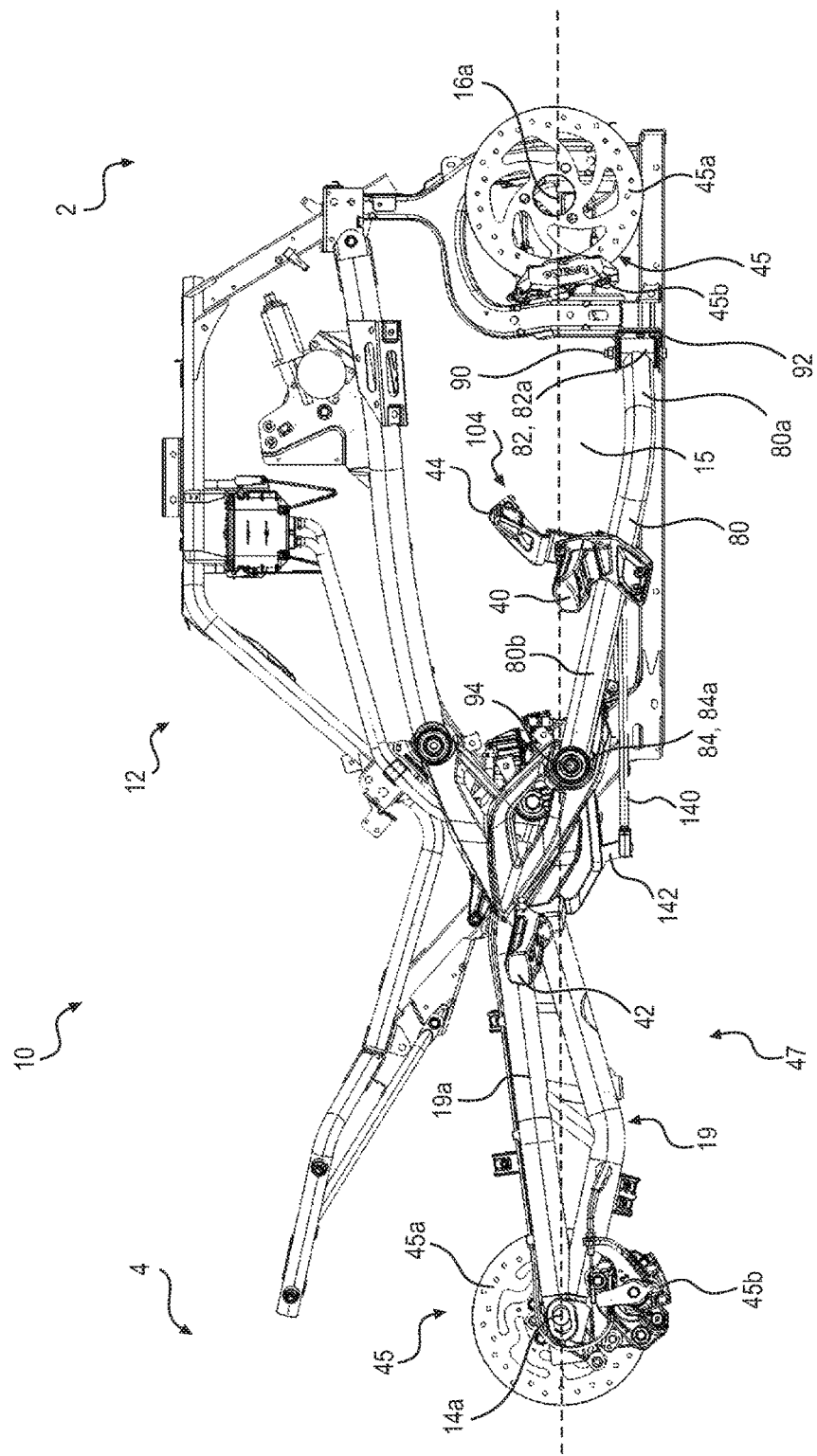
FIG. 5B is a right side elevation view of the frame, brake assembly and footrest assemblies of FIG. 5A.

With reference to FIGS. 5A and 5B, each of the two front wheels 14 and the rear wheel 16 is provided with a brake 45. The brakes 45 of the three wheels 14, 16 form a brake assembly 47. Each brake 45 is a disc-type brake mounted onto a hub of the respective wheel 14 or 16. Other types of brakes are contemplated. Each brake 45 includes a rotor 45a mounted onto the wheel hub and a stationary caliper 45b straddling the rotor 45a. The brake pads (not shown) are mounted to the caliper 45b so as to be disposed between the rotor 45a and the caliper 45b on either side of the rotor 45a. When hydraulic pressure is applied to a piston (not shown) of the caliper 45b, the brake pads squeeze the rotor 45a which, through friction, brakes the wheel 14 or 16.

With reference to FIGS. 1 to 3, and 6A to 6D, a steering assembly 50 is disposed forwardly of the straddle seat 20 to allow a driver to steer the two front wheels 14. The steering assembly 50 includes a handlebar 52 connected to a steering column 54. The steering column 54 is connected to the front wheels 14 via steering linkages 56 (FIG. 6D) such that turning the handlebar 52 turns the steering column 54 which, through the steering linkages 56, turns the wheels 14. In the illustrated implementation of the vehicle 10, the steering assembly 50 includes a power steering unit (not shown) to facilitate steering of the vehicle 10. It is contemplated that the power steering unit could be omitted.

With reference to FIGS. 1 to 3, and 6A to 6D, the handlebar 52 includes a central portion 52a connected to the upper end of the steering column 54. The central portion 52a extends upwardly and leftwardly to a left handle 52b, and upwardly and rightwardly to a right handle 52b. A left hand grip 53 and a right hand grip 53 are placed respectively around the left and right handles 52b. A clutch actuator 59 (FIGS. 3 and 6B) is connected to the handlebar 52 near the left hand grip 53. It is contemplated that a hand operated brake actuator could also be connected to the handlebar 52 near one of the hand grips 53. In the illustrated implementation of the vehicle 10, the position of the handles 52b and the grips 53 is adjustable. The handles 52b and grip 53 may be repositioned, for example, in accordance with the driver's size and preferences.

FIGS. 6A to 6D show the grips 53 being disposed in two different positions: a rearward handlebar position X (shown in dotted lines) and a forward handlebar position Y (shown in solid lines). In the illustrated implementation, the vertical and lateral direction positions of the grips 53 and the handles 52b are the same in the rearward handlebar position X and the forward handlebar position Y. It is however contemplated that the vertical and/or lateral positions of the grips 53 and handles 52b could also be different in the different handlebar positions X and Y.

In the illustrated implementation of the vehicle 10, the central portion 52a of the handlebar 52 is replaced to change the position of the handles 52b with respect to the steering column 54, the vehicle frame 12 and the seat 20. It is also contemplated that the central portion 52b could be pivotably connected to the steering column 54 for adjusting the position of the handles 52b and the grips 53. For example, the central portion 52a could be pivotably connected to the steering column 54 so as to be pivotable about an axis normal to the longitudinal centerplane 7 (when the vehicle 10 is steered in a straight-ahead direction) in order to move the handles 52b and grips 53 longitudinally and vertically.

It is contemplated that the handlebar 52 could be disposed in more than two different positions. It is contemplated that the handlebar positions X and Y could be different than as shown herein. It is contemplated that the handlebar 52 could not be adjustable in position and be could disposed in one fixed position.

With reference to FIGS. 2 to 6D, a driver footrest 40 is disposed on either side of the vehicle 10 and vertically lower than the straddle seat 20 to support the driver's feet. In the implementation of the vehicle 10 illustrated in FIGS. 1 to 12, the driver footrests 40 are in the form of foot pegs. It is also contemplated that the footrests 40 could be in the form of footboards as shown in FIGS. 13 to 15B. The left driver footrest 40 is mounted on a left rail 80 connected to the frame 12 and disposed on a left side of the longitudinal centerplane 7. The right driver footrest 40 is mounted on a right rail 80 connected to the frame 12 and disposed on a right side of the longitudinal centerplane 7.

The driver footrests 40 are slidably mounted to their respective rails 80 and can be retained at different positions thereon as will be discussed below in further detail. FIGS. 6A to 6D show the driver footrests 40 being disposed in a forward position E (shown in solid lines) and a rearward position A (shown in dotted lines) on the corresponding rails 80. As will be discussed below in further detail, the footrests 40 can be mounted in intermediate positions B, C, and D (FIGS. 10A to 10C) between the rearward position A and the forward position E. It is contemplated that the footrests 40 could be positioned further rearward than the position A or further forward than the position A shown herein. It is also contemplated that the footrest 40 could be positioned in greater or fewer than three positions between the positions A and E shown herein.

Figure 11A:
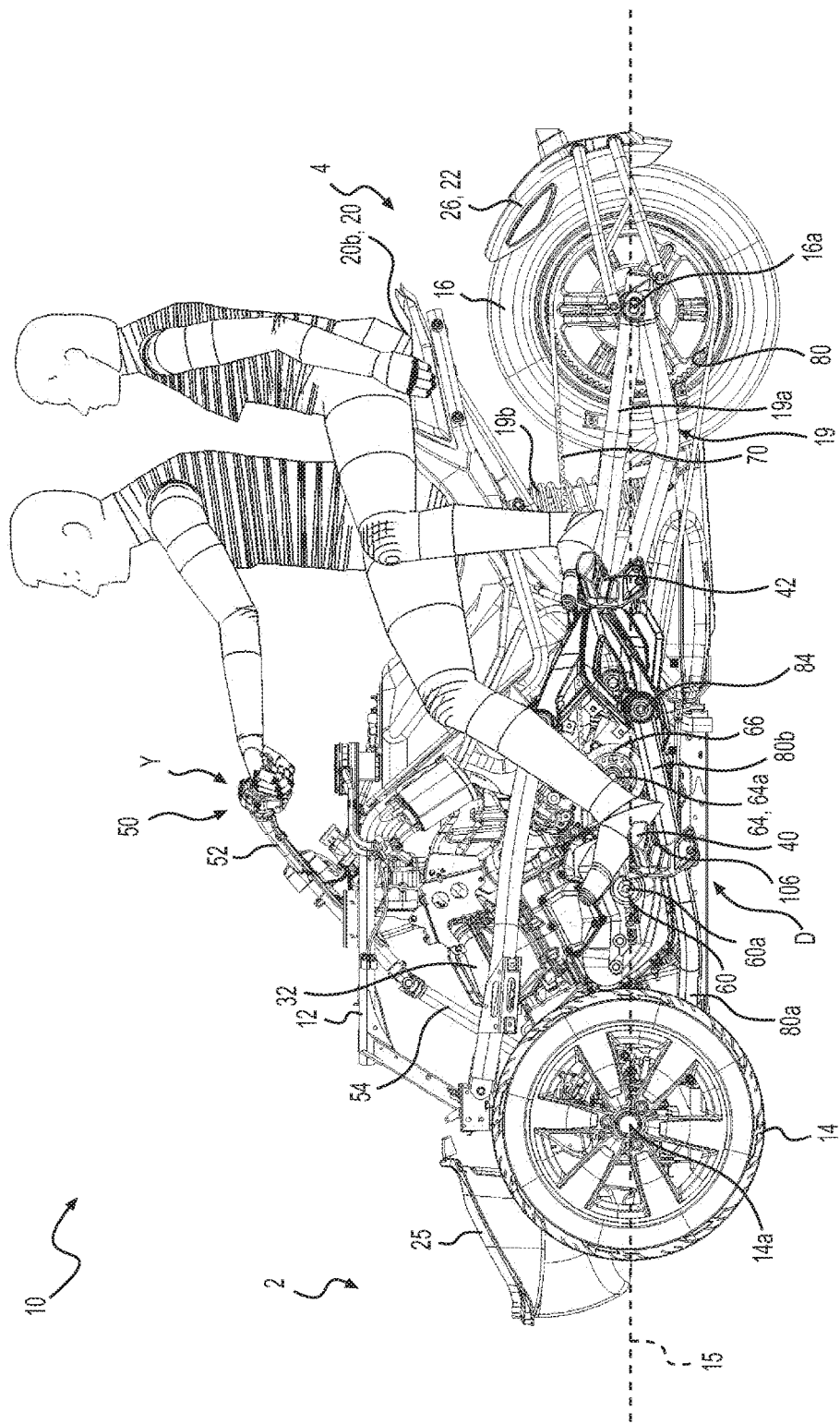
FIG. 11A is a left side elevation view of the vehicle of FIG. 1 with some of the fairings removed to show the internal components, with a driver and a passenger seated thereon and with the driver footrests being disposed in a forward position.
Figure 11B:
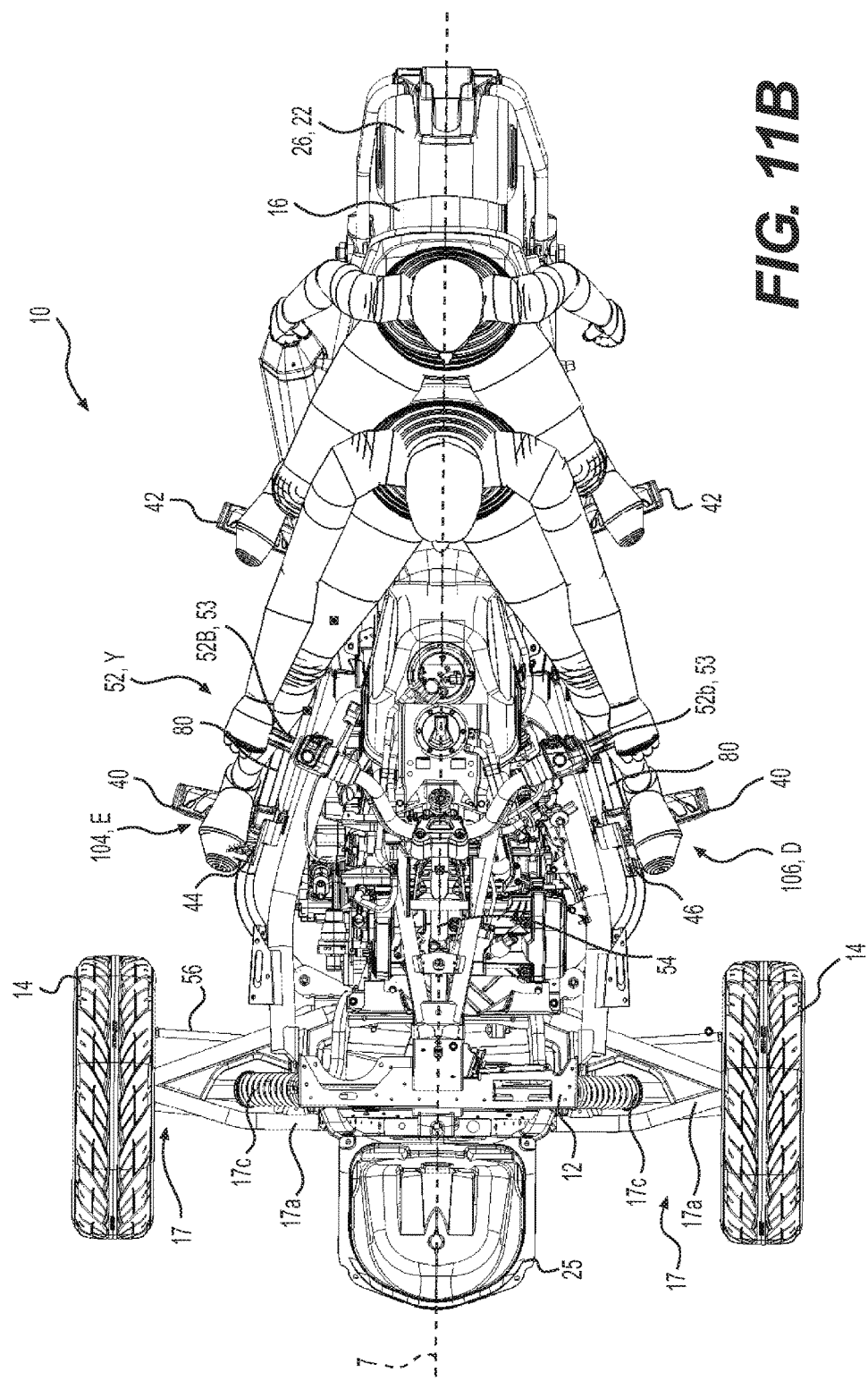
FIG. 11B is a top plan view of the vehicle, the driver and the passenger of FIG. 11A.
Figure 11C:
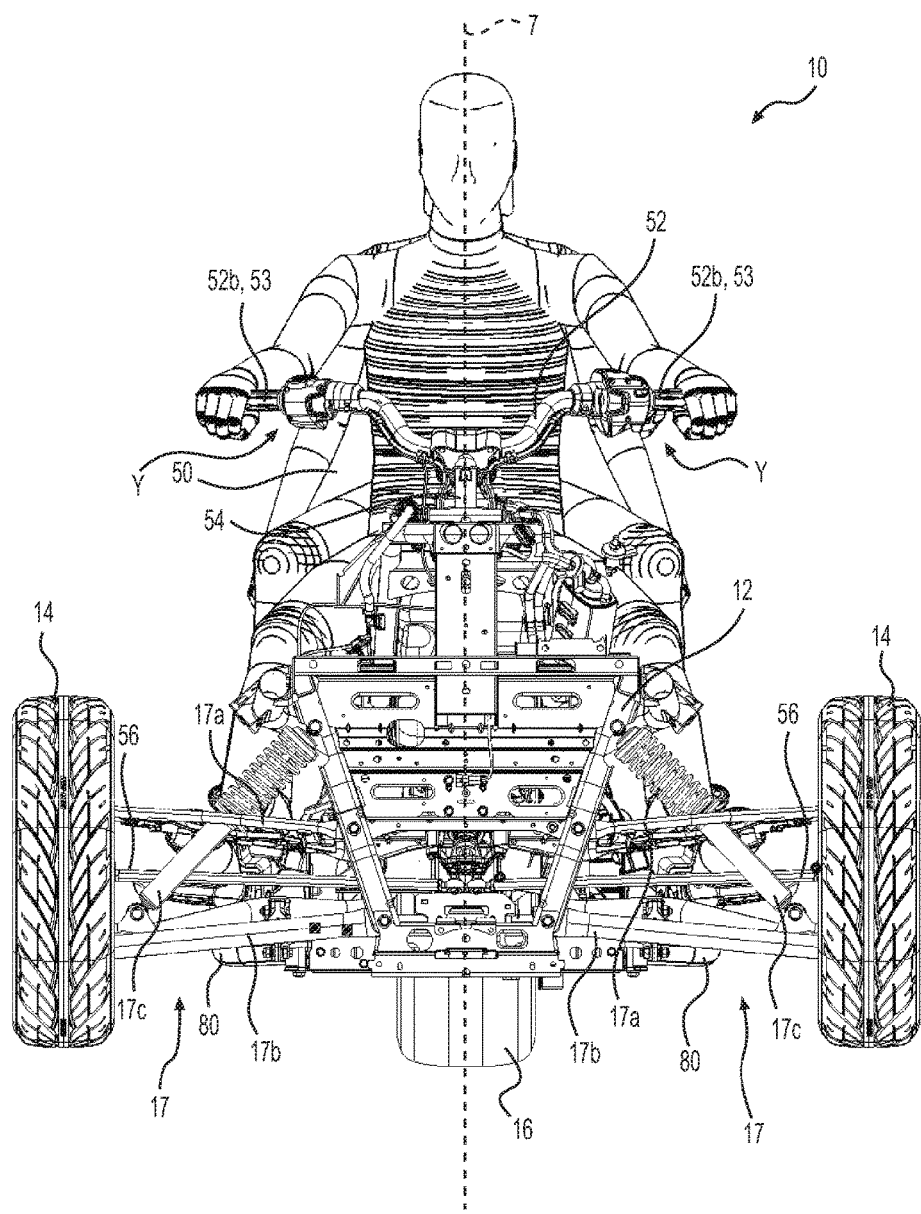
FIG. 11C is a front elevation view of the vehicle, the driver and the passenger of FIG. 11A.
Figure 11D:
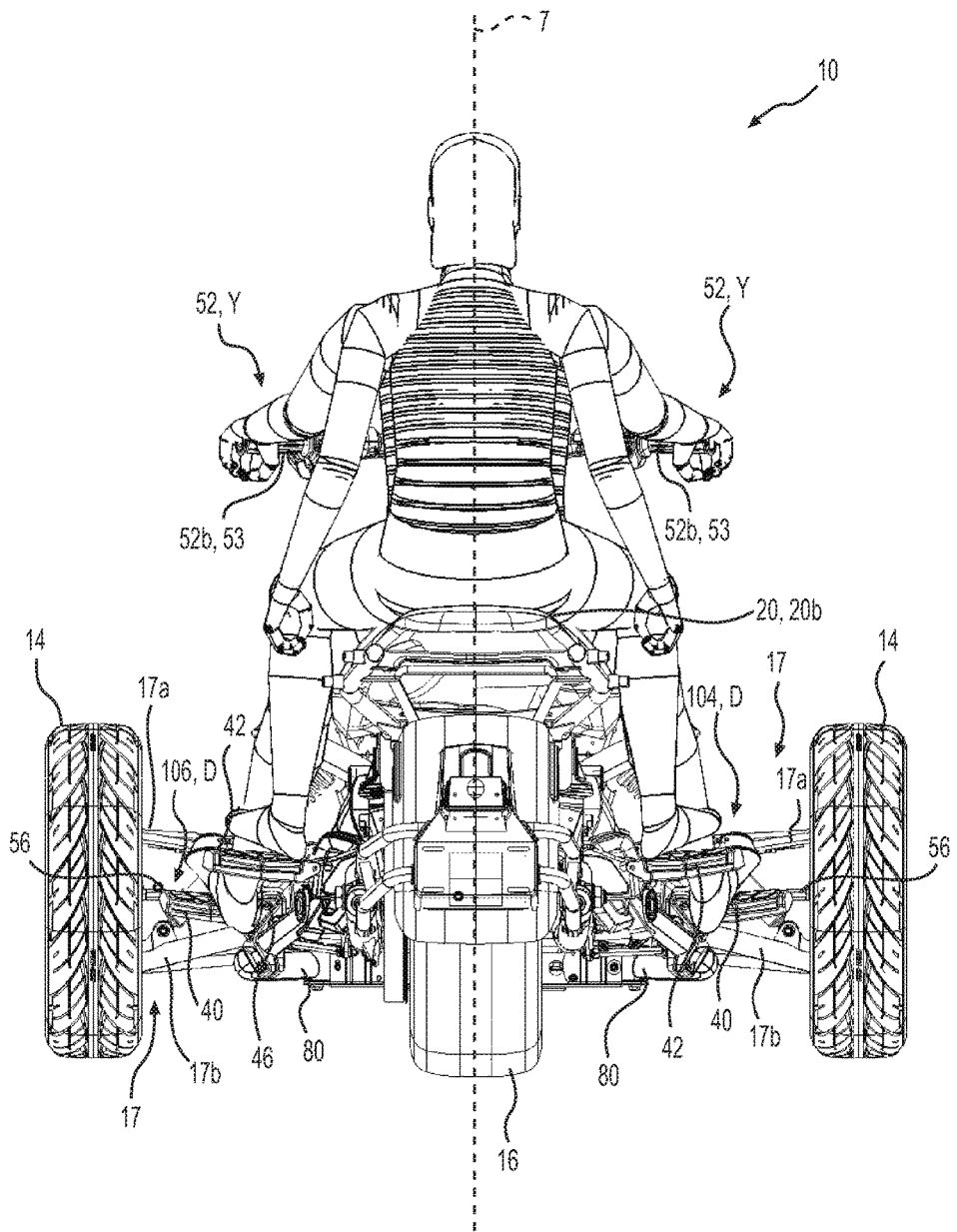
FIG. 11D is a rear elevation view of the vehicle, the driver and the passenger of FIG. 11A.

FIGS. 11A to 11D show the vehicle 10 with the footrests 40 being positioned in the position D which is slightly longitudinally rearward, vertically higher and laterally inward relative to the position E shown in the FIGS. 6A to 6D. As can be seen in FIG. 11A, the left footpeg 40 is disposed below the rotation plane 15 in the position D. The left footpeg 40 is disposed longitudinally rearward of and vertically lower than the crankshaft axis 60a when in the position D. In the position D, the left footpeg 40 is disposed longitudinally forward of and vertically lower than the transmission output shaft axis 64a. The right footpeg 40 is longitudinally and vertically aligned with the left footpeg 40 in the illustrated implementation.

Figure 12:
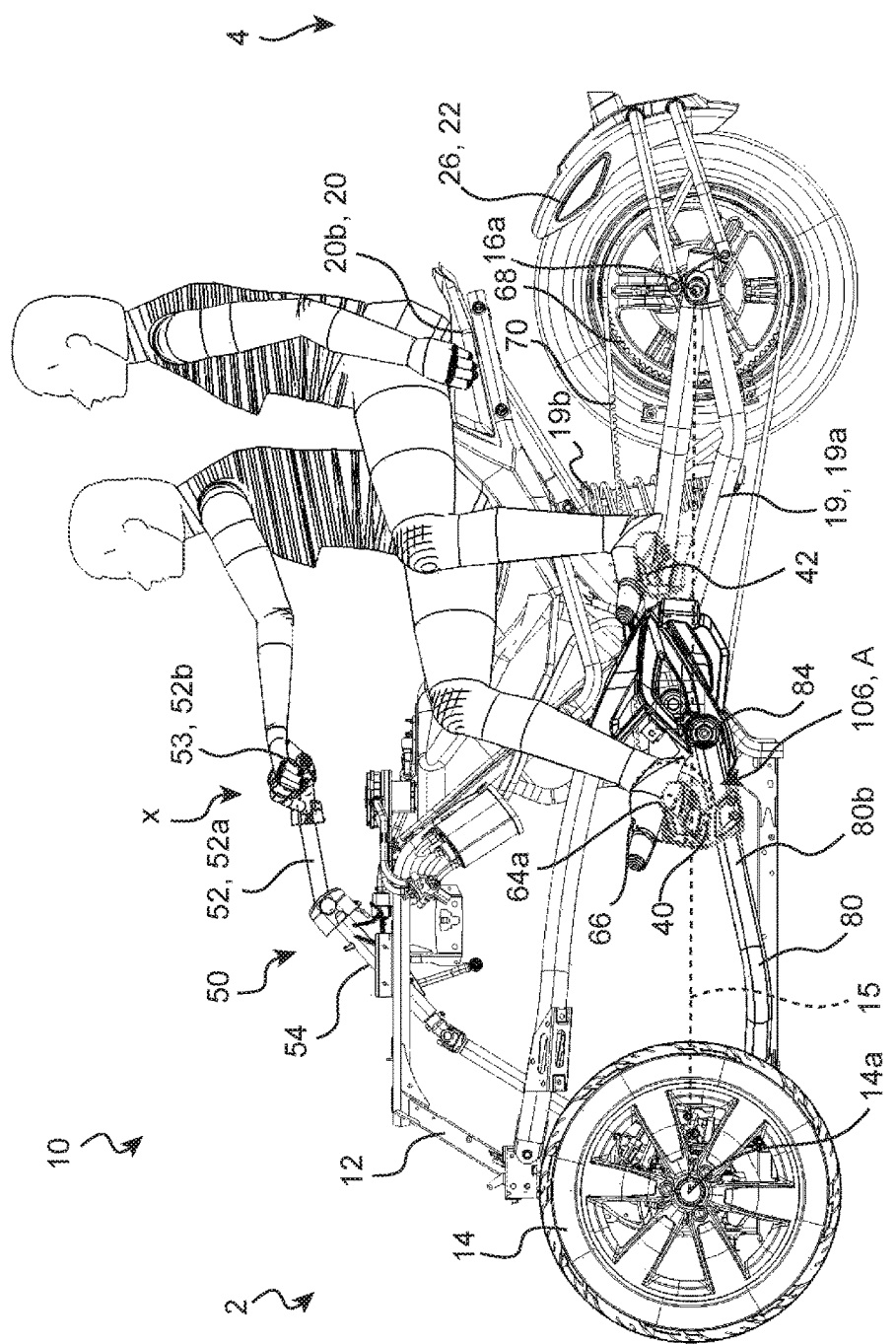
FIG. 12 is a left side elevation view of the vehicle of FIG. 11A with a different driver and the same passenger as in FIG. 11A, and with the driver footrests being disposed in the rearward position and the handlebar being disposed in the forward handlebar position.

As can be seen in FIG. 12, in the rearward position A, the left footpeg 40 is disposed above the rotation plane 15. The left footpeg 40 is disposed longitudinally rearward of the crankshaft axis 60a, and extends slightly vertically higher than the crankshaft axis 60a. The left footpeg 40 is disposed generally vertically and longitudinally aligned with the transmission sprocket 66 in the rearward position A. The right footpeg 40 is vertically and longitudinally aligned with the left footpeg 40 in the illustrated implementation.

As can be seen in FIGS. 11A to 12, the footrests 40 of the vehicle 10 described herein are disposed longitudinally forward of the seat 20 in order to ensure a riding style in which the driver's feet and legs are stretched out forward of the driver regardless of the position of the footrests 40. In contrast, in a sport vehicle, the seat and the footrests are positioned such that the driver's legs are bent at the knees with the driver's feet being positioned under the driver.

Figure 6A:
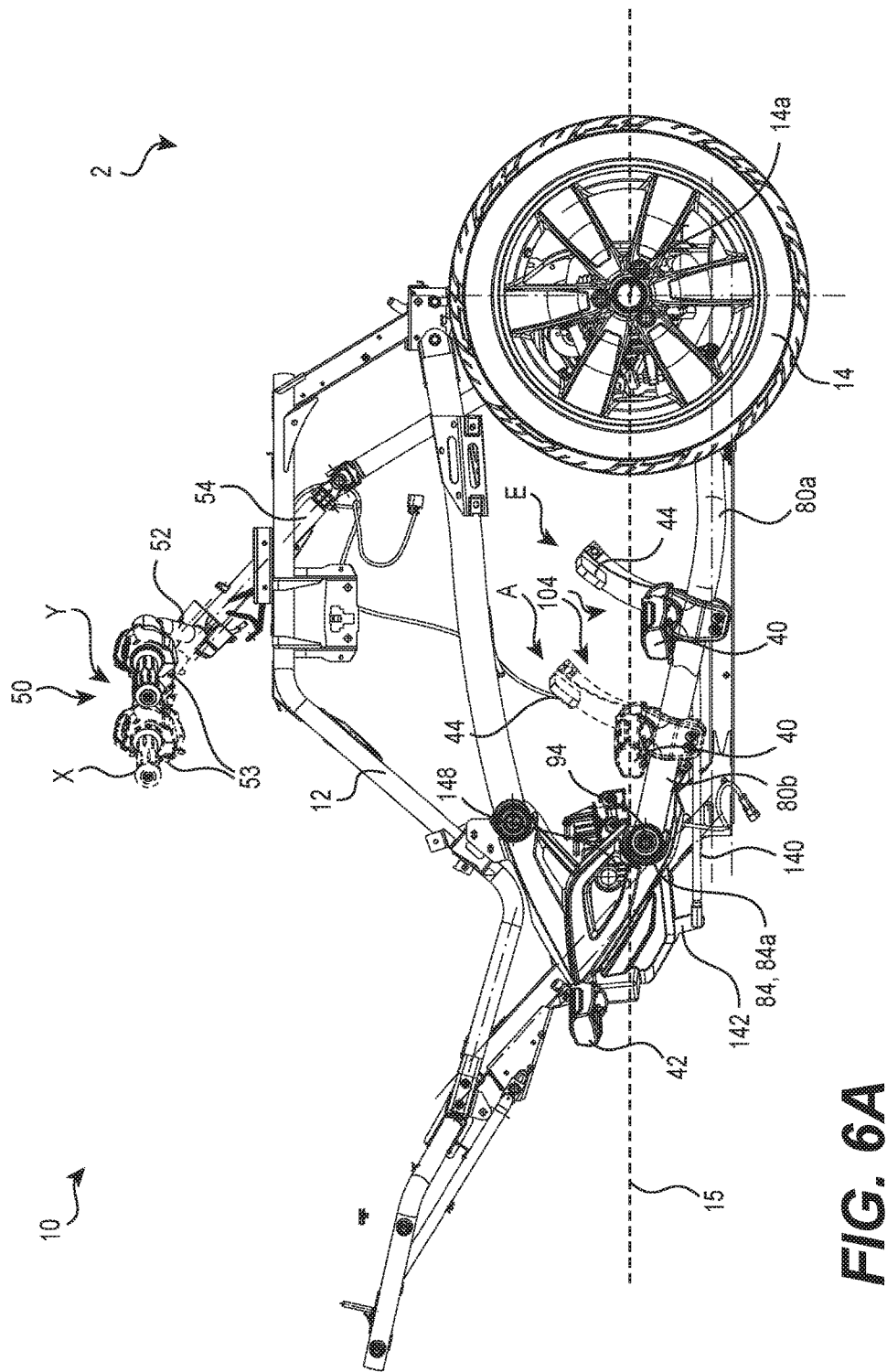
FIG. 6A is a right side elevation view of a portion of the vehicle of FIG. 1 with the right footrest assembly being shown in a forward position (solid lines) and a rearward position (dashed lines), and the handlebar being shown in a forward handlebar position (solid lines) and a rearward handlebar position (dashed lines.
Figure 6C:
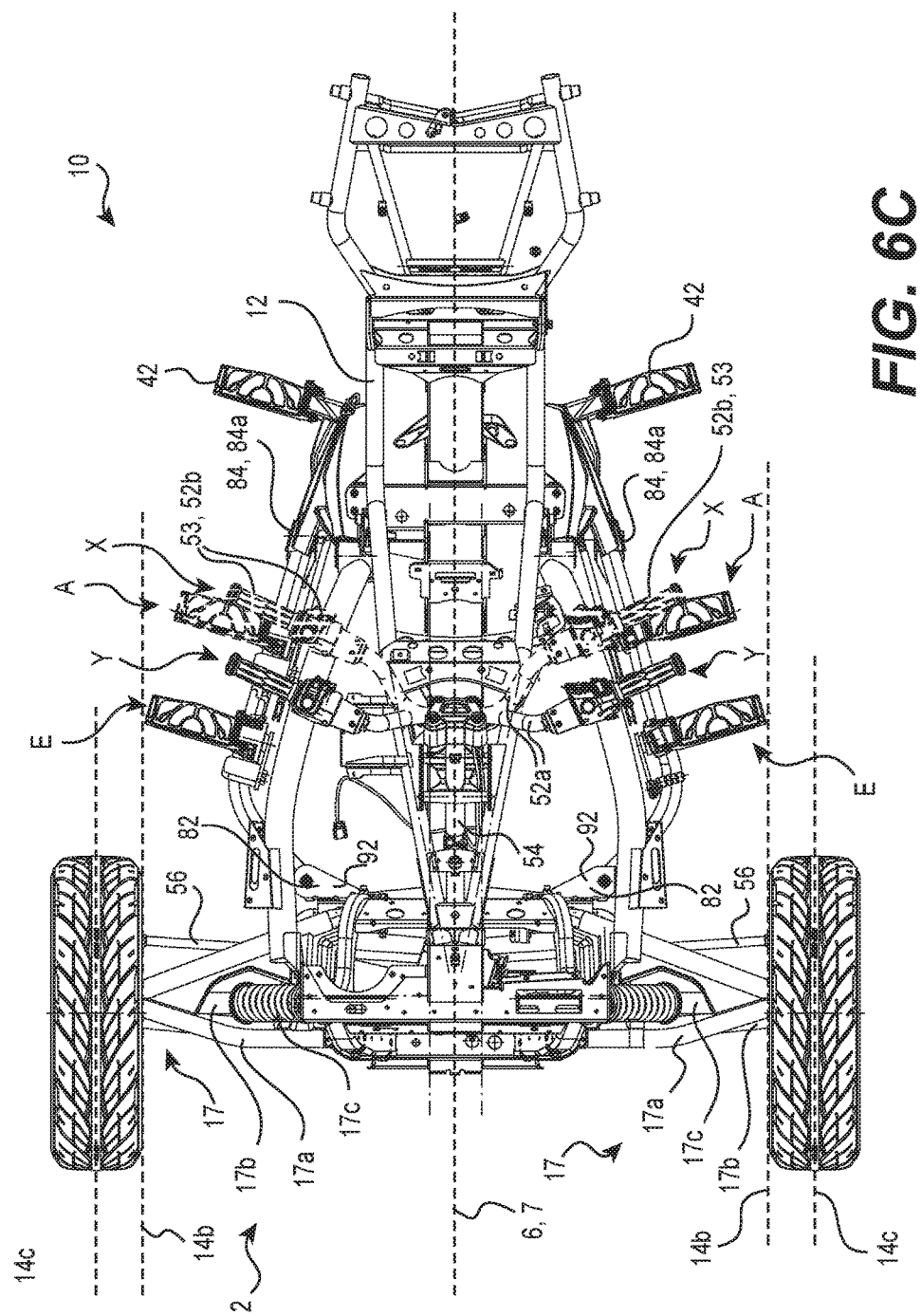
FIG. 6C is a top plan view of the vehicle portion of FIG. 6A.
Figure 6D:
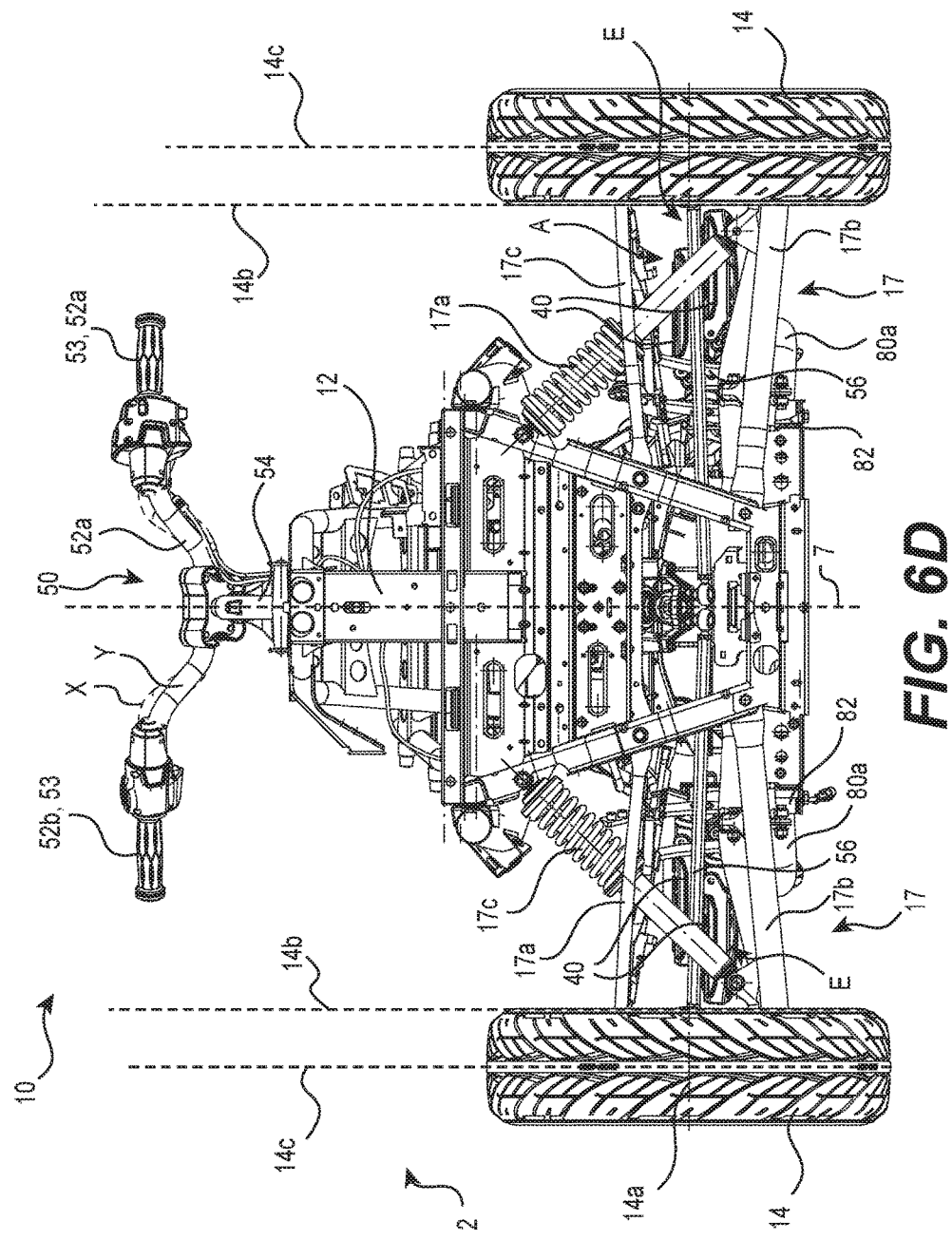
FIG. 6D is a front elevation view of the vehicle portion of FIG. 6A.
Figure 8B:
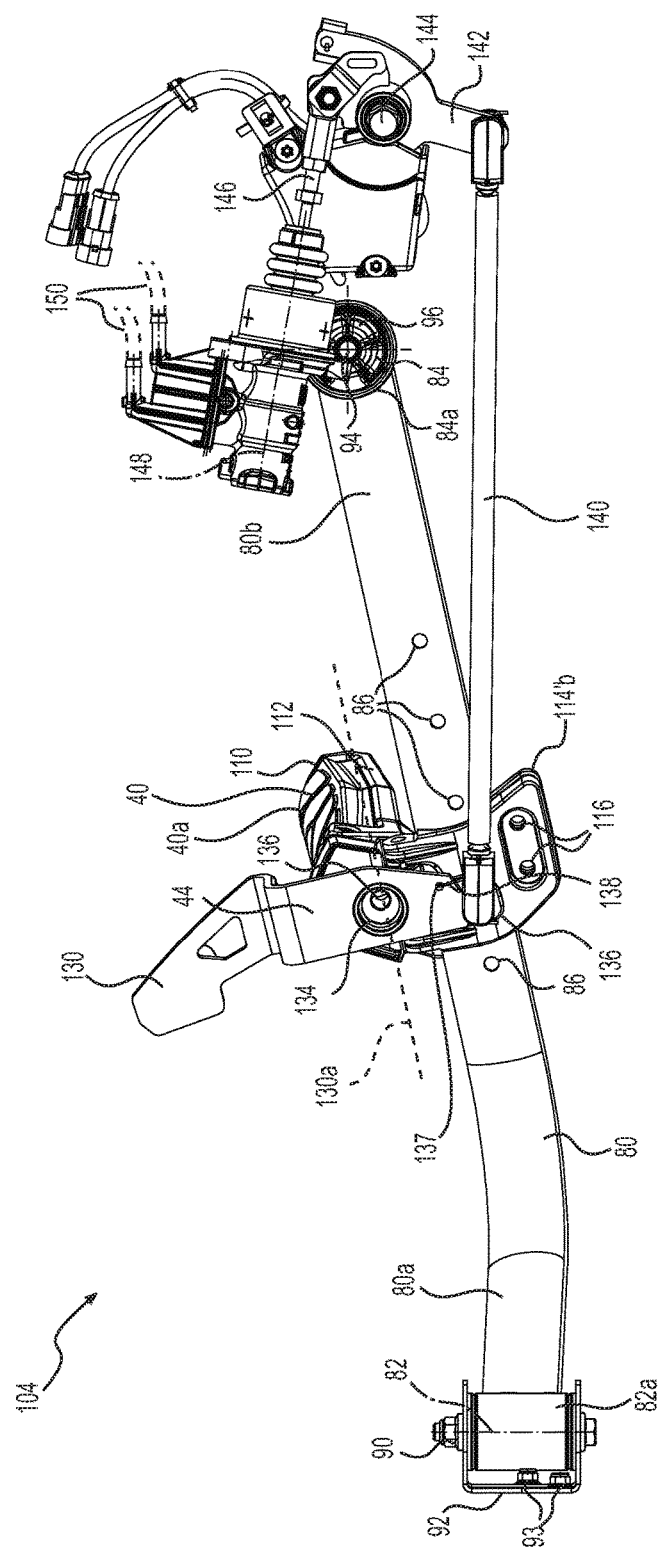
FIG. 8B is a left side elevation view of the right footrest assembly and right rail of FIG. 8A.
Figure 8D:
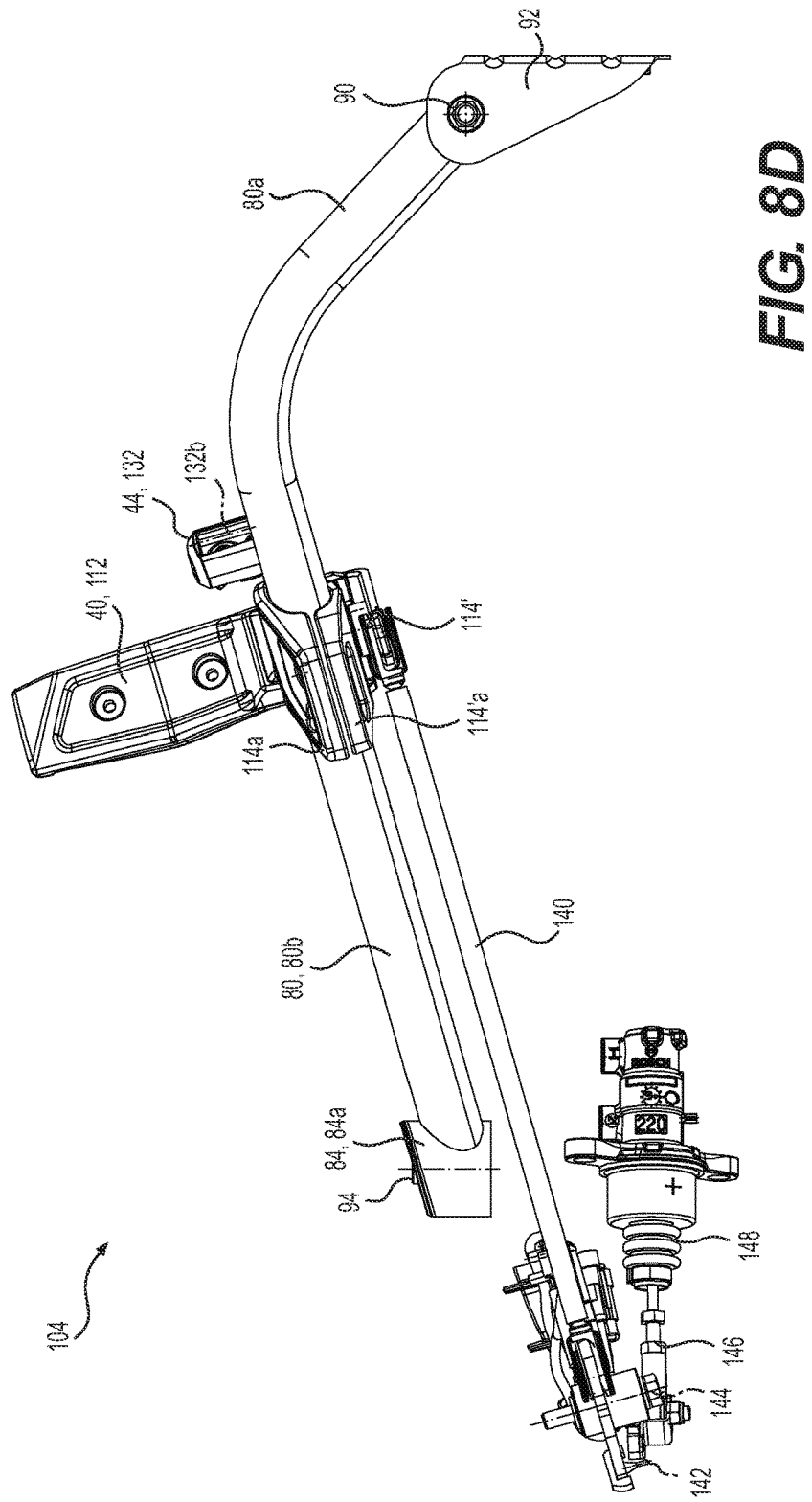
FIG. 8D is a bottom plan view of the right footrest assembly and right rail of FIG. 8A.
Figure 8F:
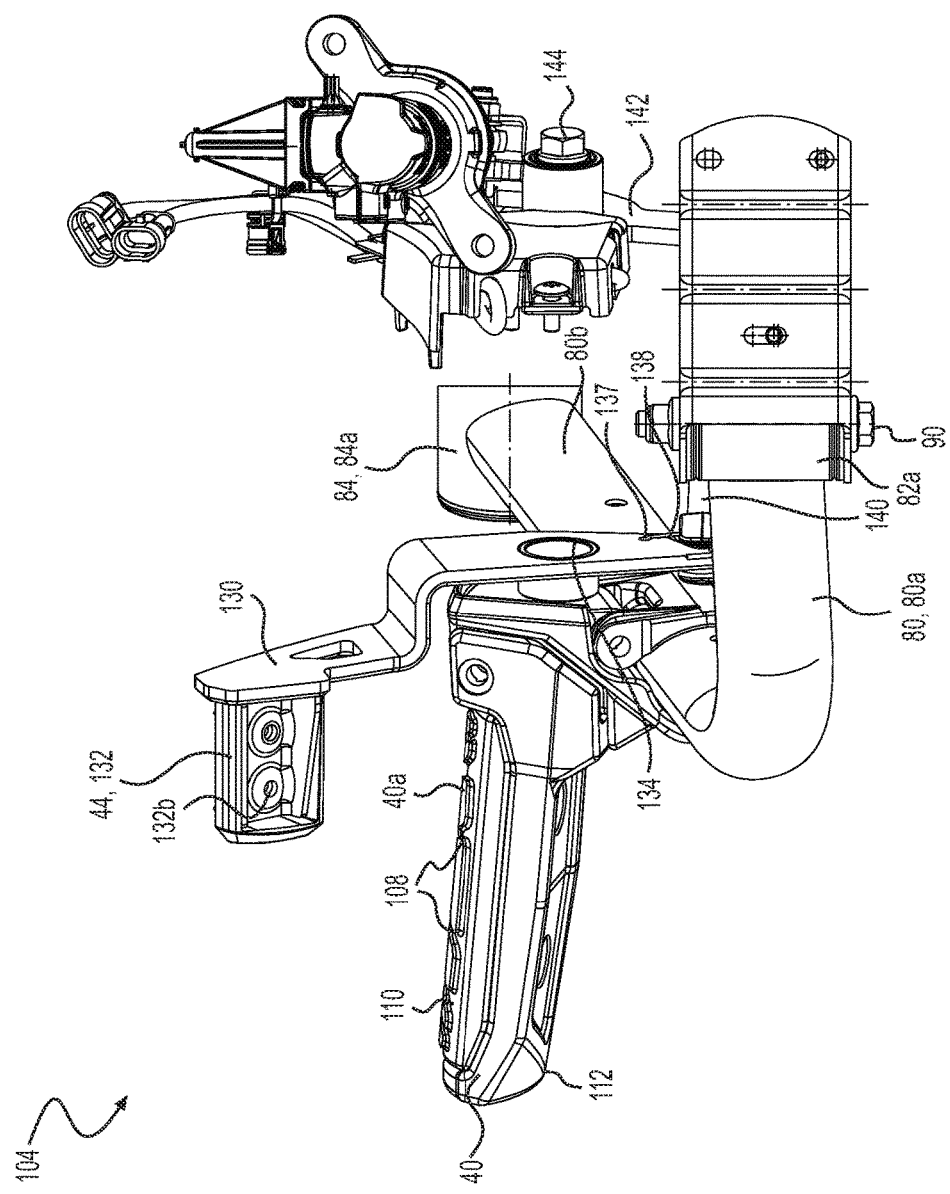
FIG. 8F is a front elevation view of the right footrest assembly and right rail of FIG. 8A.

As can be seen in FIGS. 6C and 6D, when the vehicle 10 is steered in a straight ahead direction and the footrests 40 are disposed in either position A or position E, the left footrest 40 is disposed laterally inwardly of a plane 14b parallel to the longitudinal centerplane 7 and passing through the right (inner) edge of the left wheel 14. For both footrest positions A and E, a plane 14c parallel to the longitudinal centerplane 7 and passing through a center of the left wheel 14 is thus disposed leftwardly (laterally outwardly) of the left footrest 40 when the vehicle 10 is steered in a straight ahead direction. In both footrest positions A and E, the right footrest 40 is similarly disposed laterally inwardly of a plane 14b parallel to the longitudinal centerplane 7 and passing through the left (inner) edge of the right wheel 14 when the vehicle 10 is steered in a straight ahead direction for. A plane 14c parallel to the longitudinal centerplane 7 and passing through a center of the right wheel 14 is thus disposed rightwardly (laterally outwardly) of the right footrest 40 in either position A or E, when the vehicle 10 is steered in a straight ahead direction.

With reference to FIG. 6C, when the handlebar 52 is disposed in the forward position Y and the footpegs 40 are disposed in the forward position E, the grips 53 are disposed longitudinally rearward of the footpegs 40. When the handlebar 52 is disposed in the forward position Y and the footpegs 40 are disposed in the rearward position A, the grips 53 are disposed longitudinally forward of the footpegs 40. When the handlebar 52 is disposed in the rearward position X and the footpegs 40 are disposed in the forward position E, the grips 53 are disposed longitudinally rearward of the footpegs 40. When the handlebar 52 is disposed in the rearward position X and the footpegs 40 are disposed in the rearwardmost position A, the grips 53 are disposed mostly longitudinally rearward of the footpegs 40.

Figure 3:
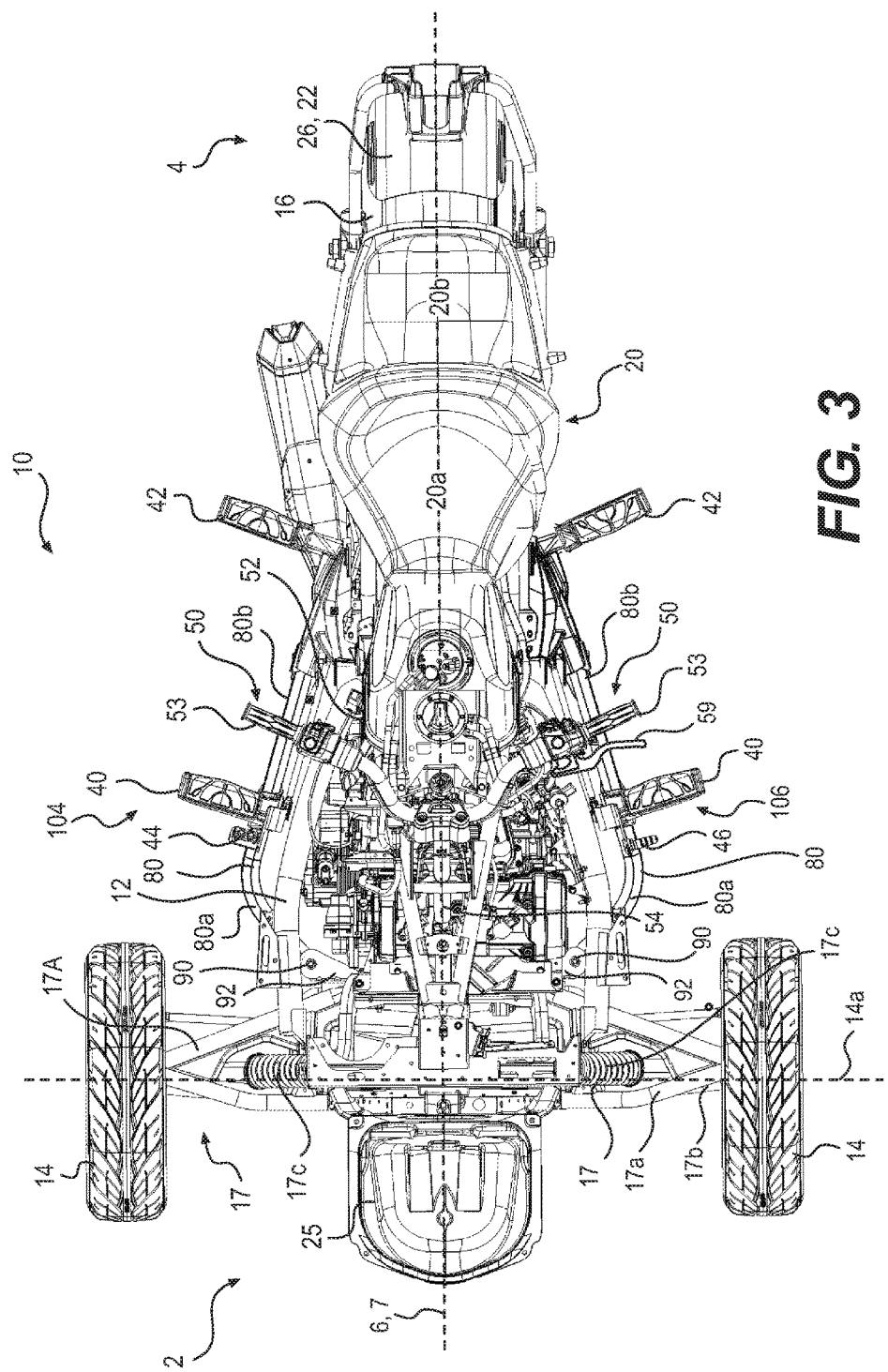
FIG. 3 is a top plan view of the vehicle of FIG. 2.

As can be seen in FIGS. 3 and 5B, a brake actuator 44, in the form of a foot-operated brake lever, is connected to the right driver footrest 40 for braking the vehicle 10. The foot brake lever 44 is operatively connected to the brakes 45 provided on each of the two front wheels 14 and the rear wheel 16. It is contemplated that the brake actuator 44 could be operatively connected only to the brakes 45 of the front wheels 14, or only to the brake 45 of the rear wheel 16. The brake actuator 44 is located upwardly and forwardly of the right driver footrest 40 such that the driver can actuate the brake actuator 44 with a front portion of the right foot while a rear portion of the right foot remains on the right driver footrest 40. The brake actuator 44 and the right driver footrest 40 form part of a right footrest assembly 104 which will be described in greater detail below. It is contemplated that the brake actuator 44 could be omitted and the vehicle 10 could be provided with a hand-operated brake actuator connected to the handlebar 52. It is contemplated that the brake assembly 47 could be connected to a hand-operated brake actuator mounted to the handlebar 52 in addition to the brake actuator 44 mounted to the right footrest 40.

As can be seen in FIGS. 1 to 3 and 5A, a gear-shift actuator 46, in the form of a foot-operated gear shift lever 46, is connected to the left driver footrest 40. The gear shift actuator 46 is operatively connected to a gear shift selector of the transmission of the vehicle 10 for selecting one of a plurality of gears. The gear shift actuator 46 is located forwardly of the left driver footrest 40 such that the driver can actuate the gear shift actuator 46 with a front portion of the left foot while a rear portion of the left foot remains on the left driver footrest 40. It is also contemplated that the gear shift actuator 46 could be omitted, for example, in a vehicle 10 having an automatic transmission 62. The gear shift actuator 46 and the left driver footrest 40 form part of a left footrest assembly 106 and will be described in greater detail below.

With reference to FIGS. 1 to 6D, a passenger footrest 42 is disposed on either side of the vehicle 10 and rearward of the rails 80 to provide support for the passenger's feet. The passenger footrests 42 are fixed to the frame 12. In the illustrated implementation, the passenger footrests 42 are in the form of foot pegs. It is however contemplated that the footrests 42 could be in the form of footboards.

The rails 80 will now be described with reference to FIGS. 1 to 6D. Each rail 80 is a tubular metal member having a front end 82, a rear end 84, a front portion 80a and a rear portion 80b. The left rail 80 is a mirror image of the right rail 80. As such, only the left rail 80 will be described herein.

The left rail 80 has a generally J-shape when viewed from the top (FIGS. 3 and 6C) and when viewed from the side (FIGS. 1, 2 and 5A to 6A). The front portion 80a of the left rail 80 extends rearwardly and leftwardly (laterally outwardly) from the front end 82 to the front of the rear portion 80b. The front portion 80a of the left rail 80 extends generally horizontally and is disposed slightly above the bottom of the frame 12 as can be seen when viewed from the side. The rear portion 80b of the left rail 80 extends forwardly, downwardly and leftwardly (laterally outwardly) from the rear end 84 to the rear of the generally horizontally extending front portion 80a.

With reference to FIGS. 5A, 6C and 6D, the front end 82 is connected to the frame 12 rearward of the left front suspension 17 and just above the bottom of the frame 12. As can be seen clearly in FIGS. 6C and 6D, when the vehicle 10 is steered in a straight ahead direction, the front end of the left rail 80 is disposed rightwardly (laterally inwardly) of the left wheel 14, and longitudinally between a front edge and a rear edge of the left wheel 14. The rear end 84 of the left rail 80 is disposed vertically higher than the front end 82 and is connected to the frame 12 longitudinally forward of the left passenger footrest 42 and the seat 20. The front end 82 is also disposed laterally outwardly of the rear end 84. It is contemplated that the front end 82 could be disposed laterally aligned with, or laterally inwardly of the rear end 84. As can be seen in FIGS. 5A and 5B, the front and rear ends 82, 84 are disposed vertically below the rotation plane 15 defined by the wheels 14, 16.

With reference to FIGS. 5A, 5B, 6C, and 8A to 8F, the front end 82 of the rail 80 is connected to the frame 12 by a bracket 92. The bracket 92 has a vertical front wall that is fastened to the frame 12 by bolts 93. A horizontal top wall and a horizontally bottom wall extend rearwardly from the top and bottom edges of the vertical front wall of the bracket 92. The front end 82 of the rail 80 has a cylindrical sleeve 82a, with its central cylindrical axis oriented vertically. The sleeve 82 is placed between the top and bottom walls of the bracket 92, and fastened to the bracket 92 by a vertically disposed bolt 90. The bolt 90 is inserted through the top bracket wall, the sleeve 82a and the bottom bracket wall. A nut is placed over the bottom end of the bolt 90 and tightened against the bottom bracket wall to fasten the front end 82 to the bracket 92. Vibration dampers could be placed inside the sleeve 82a between the sleeve 82a and the bolt 90 to limit transmission of vibrations from the frame 12 to the footrest 40 via the rail 80.

With reference to FIGS. 6A, 6B, and 8A to 8F, a cylindrical sleeve 84a is formed at the rear end 84 of the rail 80. The central cylindrical axis of the rear end sleeve 84a is oriented horizontally. A bolt 94 is inserted through the sleeve 84a into the frame 12 to fasten the rear end 84 to the frame 12. The bolt 94 is thus disposed horizontally. Vibration dampers could be placed inside the sleeve 84a between the sleeve 84a and the bolt 94 to limit transmission of vibrations from the frame 12 to the footrest 40 via the rail 80.

A number of openings 86 are formed on the right side (inner) surface in the left rail 80 facing toward the longitudinal centerplane 7. The openings 86 are disposed in the rear portion 80b of the rail 80. Each opening 86 represents one of a plurality of positions of the left footrest along the left rail 80. As will be explained below, each opening 86 is used to retain the left footrest 40 at that position along the left rail 80. In the illustrated implementation, the left rail 80 has five openings 86 distributed uniformly in the longitudinal direction, i.e. the longitudinal direction separation between consecutive openings 86 is uniform. It is contemplated that there could me more or less than five openings 86, and that the openings 86 could not be distributed uniformly. It is also contemplated that the openings 86 could be other than circular, for example, rectangular.

In the illustrated implementation of the vehicle 10, each opening 86 of the left rail 80 has a corresponding right rail opening 86 on the right rail 80. The corresponding left and right rail openings 86 are longitudinally and vertically aligned with one another. It is however contemplated that some of the left rail openings 86 may not be longitudinally and/or vertically aligned with a corresponding right rail opening 86, for example, if it is desired to have the left and right footrest assemblies 106, 104 mounted in the openings 86 to not be exactly vertically and/or longitudinally aligned in order to avoid interference with another component of the vehicle 10.

Turning now to FIGS. 7A to 10C, the right and left footrest assemblies 104, 106 will now be described in detail.

The right footrest assembly 104 includes the right footrest 40, the brake actuator 44 and a right clamp 114 for connecting the right footrest 40 to the right rail 80.

With reference to FIGS. 7A and 7B, the right footrest 40 is in the form of a footpeg as mentioned above. The footpeg 40 has a longitudinal direction length that is smaller than its lateral direction width. As can be seen best in FIGS. 7A and 7B, the upper surface 40a of the footpeg 40 is curved downwards towards the front and rear. It is contemplated that the upper surface 40a of the footpeg 40 could be flat instead of curved. The upper surface 40a of the footpeg 40 has several grooves 108 to provide grip between the driver's foot and the footpeg 40. The grooves 108 are formed in a grip member 110 which is held in a complementary slot formed in a grip holder 112. It is contemplated that the grip member 110 could be formed integrally with the holder 112. It is also contemplated that the grooves 108 could be omitted from the upper surface 40a of the footpeg 40.

As can be seen in FIGS. 6A and 6C, the right footpeg 40 is disposed vertically above the right rail 80 and rightwardly thereof. The right footpeg 40 is disposed longitudinally between the front and rear ends 82, 84 of the right rail 80. It is contemplated that the right footrest 40 could extend forward of the front end 82 or rearward of the rear end 84 of the rail 80, for example, if the right footrest 40 is in the form of a footboard having a longitudinal direction length that is greater than its lateral direction width.

With reference to FIGS. 7A and 7B, the right clamp 114 is attached to a left (an inner) end of the right footpeg 40 to fasten the right footpeg 40 to the right rail 80. The right clamp 114 extends downwardly from the left (inner) end of the right footpeg 40. The right clamp 114 is a clamshell type clamp with a right (outer) clamshell member 114a that is rigidly connected to the footpeg 40 and a left (inner) clamshell member 114b that is pivotably connected to the footpeg 40. The right rail 80 is held between the right and left clamshell members 114a, 114b. A pair of through-holes 116 is formed in the lower portion of each of the clamshell members 114a, 114b which extend below the rail 80. The clamp 114 is closed by pivoting the left clamshell member 114b toward the right clamshell member 114a, inserting bolts 117 (FIG. 9A) through the aligned through-holes of the clamshell members 114a, 114b, and fastening the bolts. The left clamshell member 114b can be pivoted away from the right clamshell member 114a to open the clamp 114. It is contemplated that the right clamshell member 114a could be pivotably connected to the footpeg 40 instead of the left clamshell member 114b, or that both clamshell members 114a, 114b could be pivotably connected to the footpeg 40. It is also contemplated that the clamshell members could be fastened together by fasteners other than bolts, for examples, latches, clips, and the like. It is contemplated that the right clamp 114 could be formed integrally with the right footrest 40.

As can be seen best in FIG. 7B, the left clamshell member 114b has a tab 118 projecting outwardly from its curved right side surface which contacts the right rail 80. The tab 118 is inserted into one of the openings 86 of the right rail 80 to prevent the clamp 114 and the footpeg 40 from sliding along the right rail 80. Thus, once the clamshell members 114a, 114b are fastened together, the footpeg 40 is locked in place in the position corresponding to that opening 86. It is contemplated that the right clamshell member 114a could have the tab 118 instead of the left clamshell member 114b. It is also contemplated that the rail 80 could have a plurality of tabs 118, and that the openings 86 could be disposed in the clamp 114.

With reference to FIGS. 7A to 8E, the brake actuator 44 includes a pivoting arm 130 and a pedal 132.

The pivoting arm 130 is pivotably connected to the left (inner) end of the right footpeg 40 above the connection of the right clamp 114 to the right footrest 40. The lower portion of the pivoting arm 130 has an opening 134 (best seen in FIG. 7A). A fastener (not shown) is inserted through the opening 134 into an opening 124 (FIG. 7A) formed in the left (inner) end of the footpeg 40 to pivotably connect the pivoting arm 130 to the footpeg 40. It is contemplated that the pivoting arm 130 could be connected to the right clamp 114 instead of the footrest 40. The pivot axis 130a of the brake actuator 44 extends laterally and above the portion of the right rail 80 enclosed between the left and right clamshell members 114a, 114b. The upper portion of the pivoting arm 130 disposed above the footpeg 40 extends forwardly and upwardly. The pivoting arm 130 is biased so that the pivoting arm returns to its default unactuated position when it is not being actuated. A groove 136 is defined in the lower portion of the pivoting arm 130. The groove 136 extends from a rear edge of the pivoting arm 130 towards a front edge thereof. Another opening 137 is defined in the lower portion of the pivoting arm 130 above the groove 136 and below the opening 134. A wire retainer 138 is inserted through the opening 137 and around the front edge of the lower portion of the pivoting arm 130 to retain a linkage rod 140 (FIG. 8A) in the groove 136. The linkage rod 140 operatively connects the brake actuator 44 to the brake assembly 47 as will be described below.

With reference still to FIGS. 7A to 8E, the pedal 132 is rigidly connected to an upper end of the pivoting arm 130 and extends rightwardly therefrom. The pedal 132 is disposed forwardly and vertically higher than the footpeg 40 so that the pedal 132 can be pushed by a front portion of the driver's right foot while the rear portion of the driver's right foot is resting on the footpeg 40. Since the brake actuator 44 is connected to the footrest 40, the brake actuator 44 is moveable along with the footrest 40 when the footrest 40 is repositioned. The footrest assembly 104 is thus easily repositioned without the need for adjusting the position of the brake actuator 44 with respect to the footrest 40 when the footrest 40 is repositioned.

The pedal 132 has a front surface 132b that faces forwardly and downwardly, and a rear surface 132a that faces upwardly and rearwardly. The rear surface 132a has grooves to facilitate gripping by the driver's foot. The pedal 132 is pushed downward and forward to rotate the pivoting arm 130 and the pedal 132 in a clockwise direction (when viewed from the right side of the vehicle 10) about the pivot axis 130a to actuate the brakes 45 as described below. The pedal 132 and pivoting arm 130 can be rotated about the pivot axis 130a from a zero or unactuated position to a maximum position (corresponds to a maximum actuation of the brakes 45). The pedal 132 can be maintained at any particular position between the zero position and the maximum position by maintaining the appropriate force on the pedal 132.

In the implementation of the footrest assembly 104 illustrated in FIGS. 7A to 8F, the upper portion of the pivoting arm 130 disposed vertically above the footpeg 40 is also laterally offset from its lower portion which has the opening 134. The upper portion of the pivoting arm 130 is offset rightwardly from its lower portion so that the pedal 132 is laterally aligned with the footpeg 40. In the implementation of the footrest assembly 104 of FIGS. 7A to 8F, the pedal 132 can be accessed easily by the driver's foot without having to excessively move the driver's foot laterally inwardly.

In some implementations of the footrest assembly 104 such as the one illustrated in FIGS. 6A to 6D, the upper portion of the pivoting arm 130 is not laterally offset from the lower portion thereof. In the implementation of the footrest assembly 104 shown in FIGS. 6A to 6D, the pedal 132 of the brake actuator 44 is laterally aligned with the portion of the rail 80 that the footpeg 40 is clamped around.

With reference now to FIGS. 8A to 8F, the actuation of the brakes 45 by the brake actuator 44, and the connection therebetween, will now be described.

As mentioned above, the linkage rod 140 is connected to the bottom end of the pivoting arm 130 opposite the upper end having the pedal 132 connected thereto. The linkage rod 140 extends rearwardly from the pivoting arm 130. The rear end of the linkage rod 140 is connected to a link 142 which rotates about a pin 144 connected to the frame 12. The link 142 is connected to a hydraulic cylinder 148 by a linkage 146 such that rotation of the link 142 about the pin 144 moves the linkage 146 into or out of the cylinder 148. The hydraulic cylinder 148 is hydraulically connected to the hydraulic piston of each brake calliper 45b via a brake line 150 (FIGS. 5A and 5B). Thus, when viewed from a right side of the vehicle 10, as shown in FIG. 8A, when the pedal 132 is pushed forwardly to rotate the pivoting arm 130 in a clockwise direction about the pivot axis 130a, the linkage rod 140 moves rearwardly. The rearward motion of the linkage rod 140 rotates the link 142 in a clockwise direction about the pin 144, moving the linkage 146 forwardly and into the cylinder 148. When the linkage 146 is pushed into the cylinder 148, the hydraulic pressure in the brake lines 150 increases, and the brakes 45 are actuated to brake the front and rear wheels 14, 16. A return spring is placed in the hydraulic cylinder 148 to bias the pivoting arm 130 to its default unactuated position. It is contemplated that the arm 130 could be biased by other means.

With reference to FIGS. 8A to 8F, since the pin 144 is fixed with respect to the frame 12, when the position of the footrest assembly 104 along the rail 80 is changed, the length of the linkage rod 140 connecting the brake actuator 44 to the link 142 has to be changed accordingly. A different linkage rod 140 is used for each position of the footrest assembly 104, based on the length of the linkage rod 140. Thus, with reference to FIGS. 6A to 6D, the linkage rod 140 used to connect the brake actuator 44 to the link 142 in the forward position E is longer than the linkage rod 140 used in the rearward position A.

With reference now to FIGS. 9A to 9D, left footrest assembly 106 will be described below. The left footrest assembly 106 includes the left footrest 40, the gear shift actuator 46 and a left clamp 114 for connecting the left footrest 40 to the left rail 80.

Figure 9A:
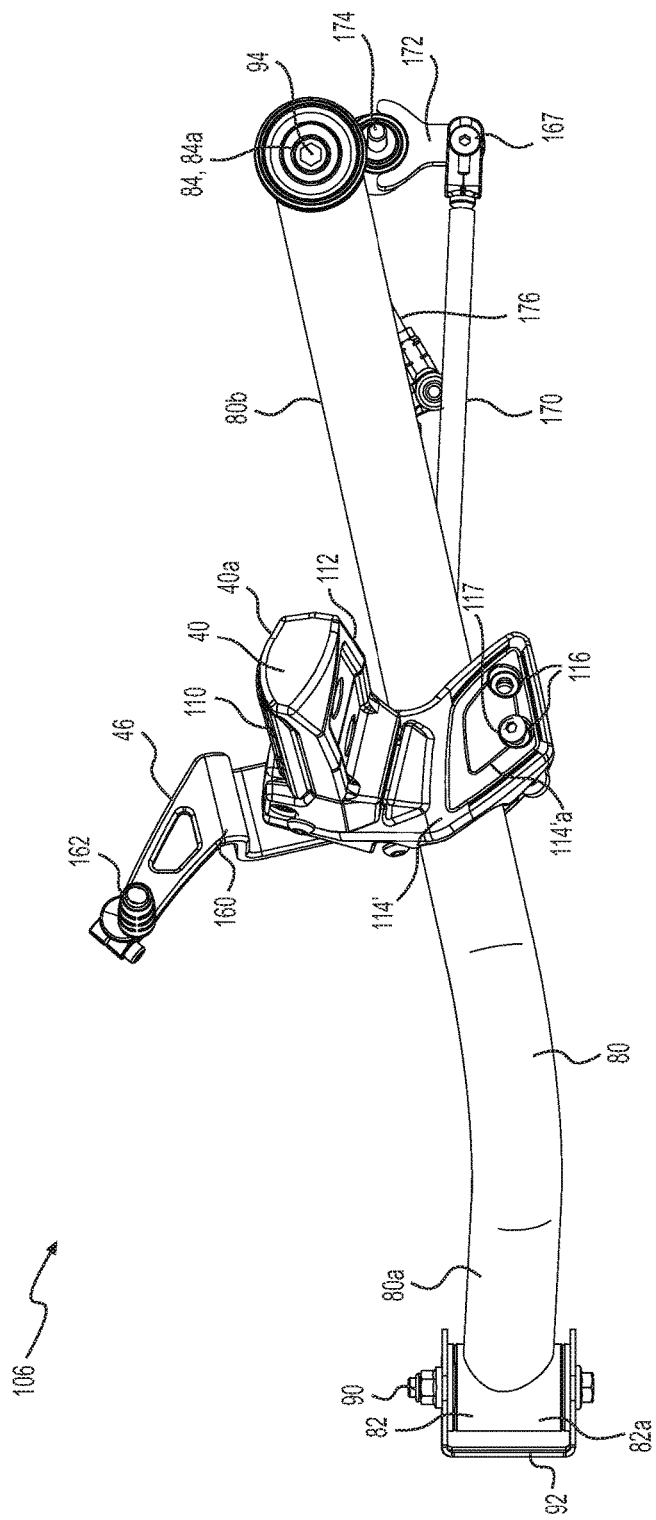
FIG. 9A is a left side elevation view of the left footrest assembly mounted to the left rail of the vehicle of FIG. 1.
Figure 9B:
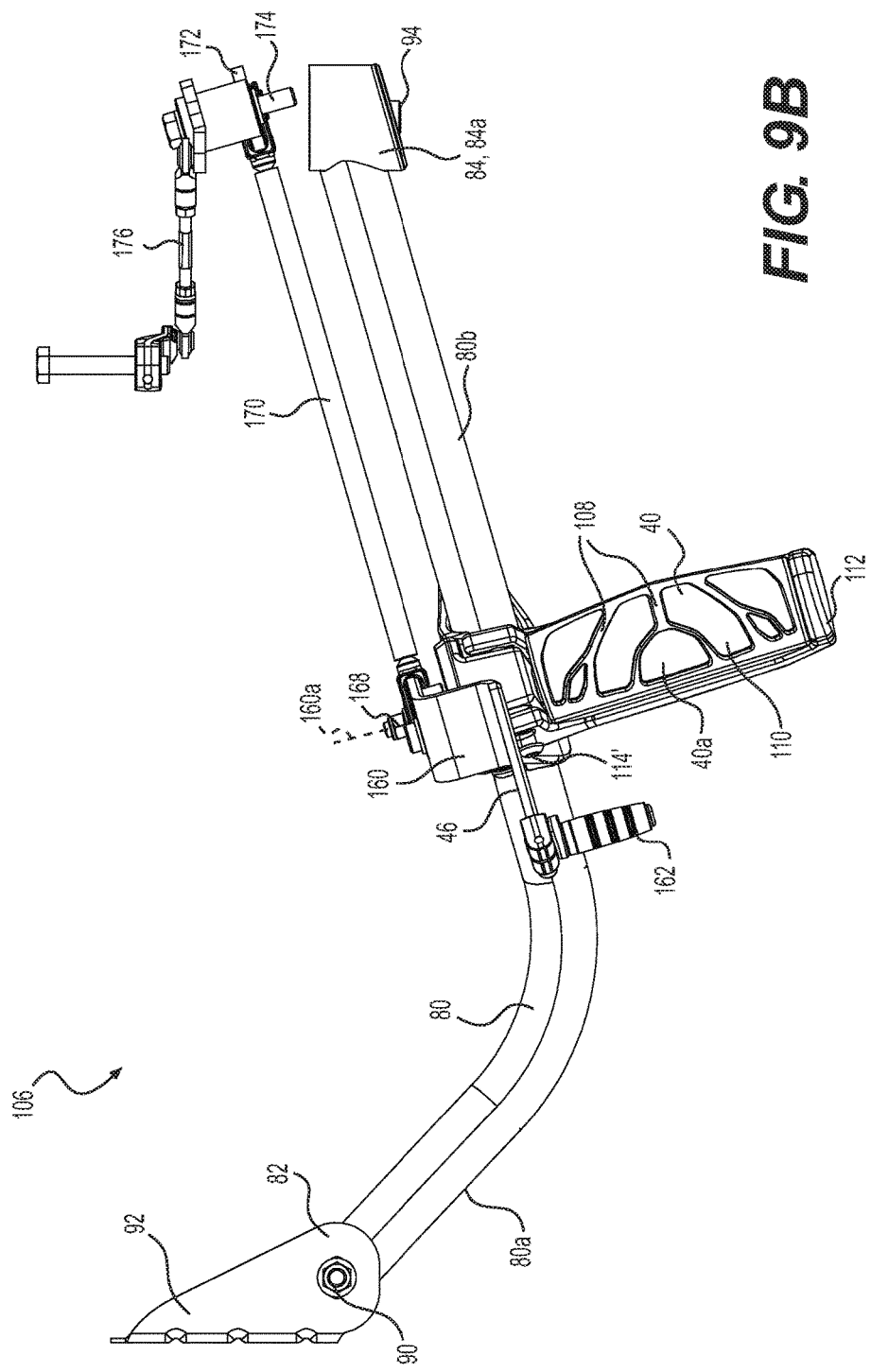
FIG. 9B is a top plan view of the left footrest assembly and left rail of FIG. 9A.
Figure 9C:
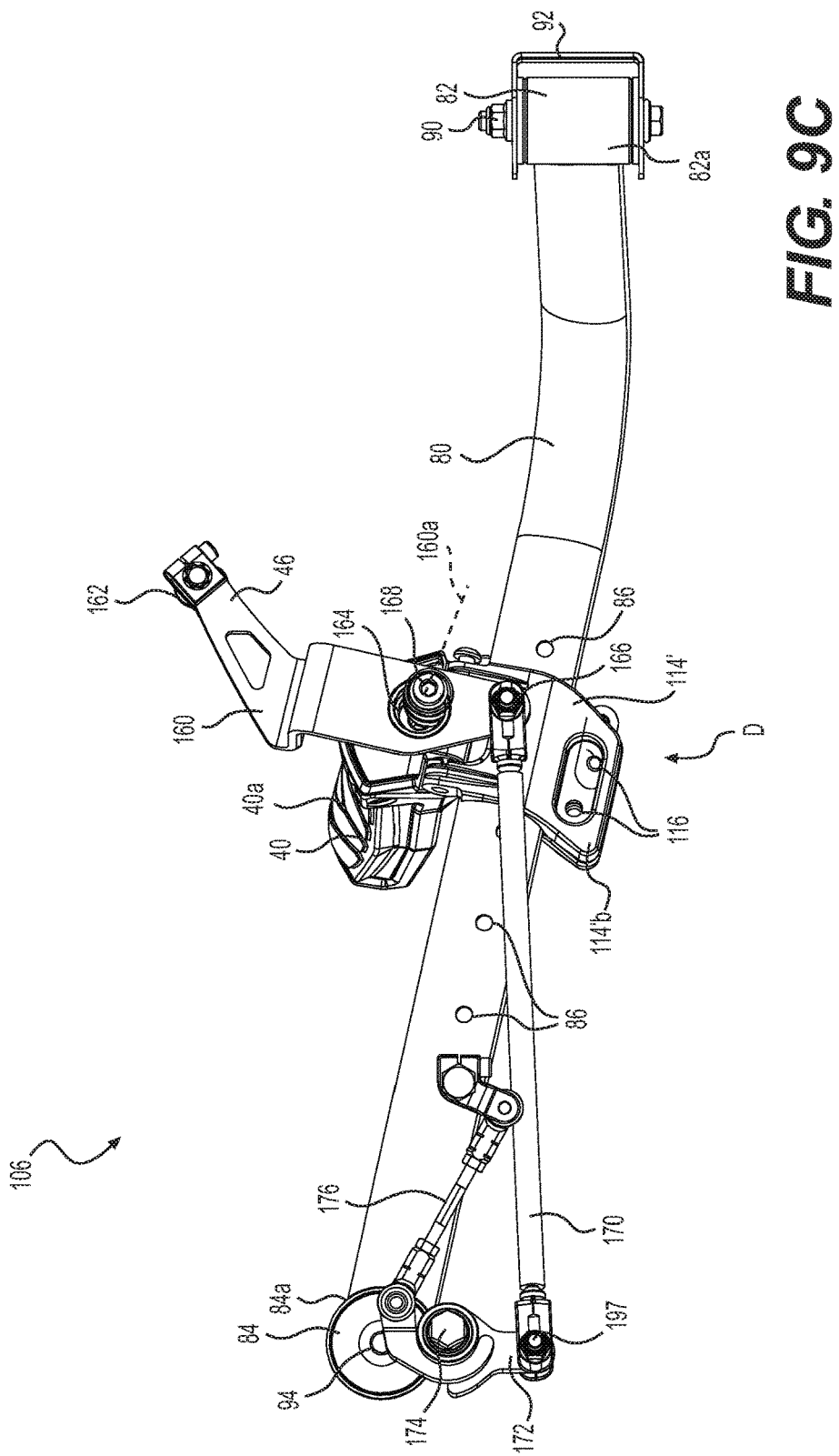
FIG. 9C is a right side elevation view of the left footrest assembly and left rail of FIG. 9A.

With reference to FIGS. 9A to 9C, the left footpeg 40 and left clamp 114 of the left footrest assembly 106 are mirror images respectively of the right footpeg 40 and right clamp 114 of the right footrest assembly 104, and as such will not be described herein. Corresponding features of the left and right footpegs 40 have been labelled with the same reference numbers, and corresponding features of the left and right clamps 114 have been labelled with the same reference numbers.

With reference to FIGS. 9A to 9C, the gear shift actuator 146 includes a pivoting arm 160 and a gear pedal 162. The pivoting arm 160 is pivotably connected to the right (inner) end of the left footpeg 40 above the connection of the left clamp 114 to the left footpeg 40. The lower portion of the pivoting arm 160 has an opening 164. A fastener 168 (FIG. 10C) is inserted through the opening 134 into an opening 124 formed in the right (inner) end of the left footpeg 40 to pivotably connect the pivoting arm 160 to the footpeg 40. It is contemplated that the pivoting arm 160 could be connected to the left clamp 114 instead of the footrest 40. The pivot axis 160a of the gear shift actuator 46 extends laterally and above the portion of the right rail 80 enclosed between the left and right clamshell members 114a, 114b. The pivoting arm 160 is spring-loaded so that the pivoting arm 160 returns to its default unactuated position when it is not being actuated. A linkage rod 170 is connected to the bottom end of the pivoting arm by a bolt 166 (FIG. 9C). The linkage rod 170 operatively connects the gear shift actuator 146 to a gear shift selector of the transmission 62. The upper portion of the pivoting arm 160 disposed above the footpeg 40 extends forwardly and upwardly. The gear shift pedal 162 is rigidly connected to an upper end of the pivoting arm 160 and extends leftwardly therefrom.

With reference to FIGS. 9A to 9C, the pedal 162 is disposed forwardly and vertically higher than the footpeg 40. When viewed from the left side of the vehicle 10 (FIG. 5A), the pedal 162 of the gear shift actuator 46 is circular in shape and much smaller than the pedal 132 of the brake actuator 44 as viewed from a right side of the vehicle 10 (FIG. 5B). The pedal 162 is spaced further from the left footpeg 40 in an upward and forward direction than the pedal 132 is from the right footpeg 40. The pedal 162 can be tapped in a downward and forward direction by a front portion of the driver's left foot while the rear portion of the driver's left foot is resting on the left footpeg 40. While the rear portion of the driver's left foot is resting on the left footpeg 40, the front portion of the driver's left foot can be inserted below the pedal 162 to lift the pedal 162 in an upward and rearward direction.

Since the gear shift actuator 46 is connected to the left footrest 40, the gear shift actuator 46 is moveable along with the left footrest 40 when the left footrest 40 is repositioned. The left footrest assembly 106 is thus easily repositioned without the need for adjusting the position of the gear shift actuator 46 with respect to the left footrest 40 when the left footrest 40 is repositioned.

In the implementation of the footrest assembly 106 illustrated in FIGS. 9A to 10C, the upper portion of the pivoting arm 160 disposed vertically above the footpeg 40 is laterally offset from its lower portion which has the opening 164. The upper portion of the pivoting arm 160 is offset leftwardly from its lower portion so that the pedal 162 is laterally aligned with the footpeg 40. In the implementation of the footrest assembly 104 of FIGS. 7A to 8F, the pedal 162 can be accessed easily by the driver's foot without having to excessively move the driver's foot laterally inwardly.

In other implementations of the footrest assembly 106 such as the one illustrated in FIGS. 6A to 6D, the upper portion of the pivoting arm 160 is not laterally offset from the lower portion thereof. In the implementation of the footrest assembly 104 shown in FIGS. 6A to 6D, the pedal 162 of the gear shift actuator 46 is laterally aligned with the portion of the left rail 80 that the footpeg 40 is clamped around.

With reference to FIGS. 9A to 9C, a linkage rod 170 is connected to a bottom end of the pivoting arm 160 opposite the upper end having the pedal 162 connected thereto. The linkage rod 162 extends rearwardly from the pivoting arm 160. The rear end of the linkage rod 170 is connected to a link 172 which rotates about a pin 174 connected to the frame 12. The link 172 is connected to the gear shift selector of the transmission 62 by a linkage 176 such that rotation of the link 172 about the pin 174 moves the linkage 176 and causes the gear shift selector to engage a different gear in the transmission 62.

Thus, when viewed from a left side of the vehicle 10 as shown in FIG. 9A, when the pedal 162 is pushed forwardly and downwardly to rotate the pivoting arm 160 in a counter-clockwise direction about the pivot axis 160a, the linkage rod 170 moves rearwardly. The rearward motion of the linkage rod 170 rotates the link 172 in a clockwise direction about the pin 174, moving the linkage 176 forwardly. Each forward and downward push on the pedal 162 actuates the gear selector shaft of the transmission 62 to engage a gear one step lower than the currently engaged gear. When the pedal 162 is lifted upwardly and rearwardly, the pedal 162 and pivoting arm 160 rotate in clockwise direction about the pivot axis 160a, moving the linkage rod 170 forwardly. The forward motion of the linkage rod 170 rotates the link 172 in a counter-clockwise direction about the pin 174, which moves the linkage 176 rearwardly. Each rearward and upward push on the pedal 162 actuates the gear selector shaft of the transmission 62 to engage a gear one step higher than the currently engaged gear.

Figure 10A:
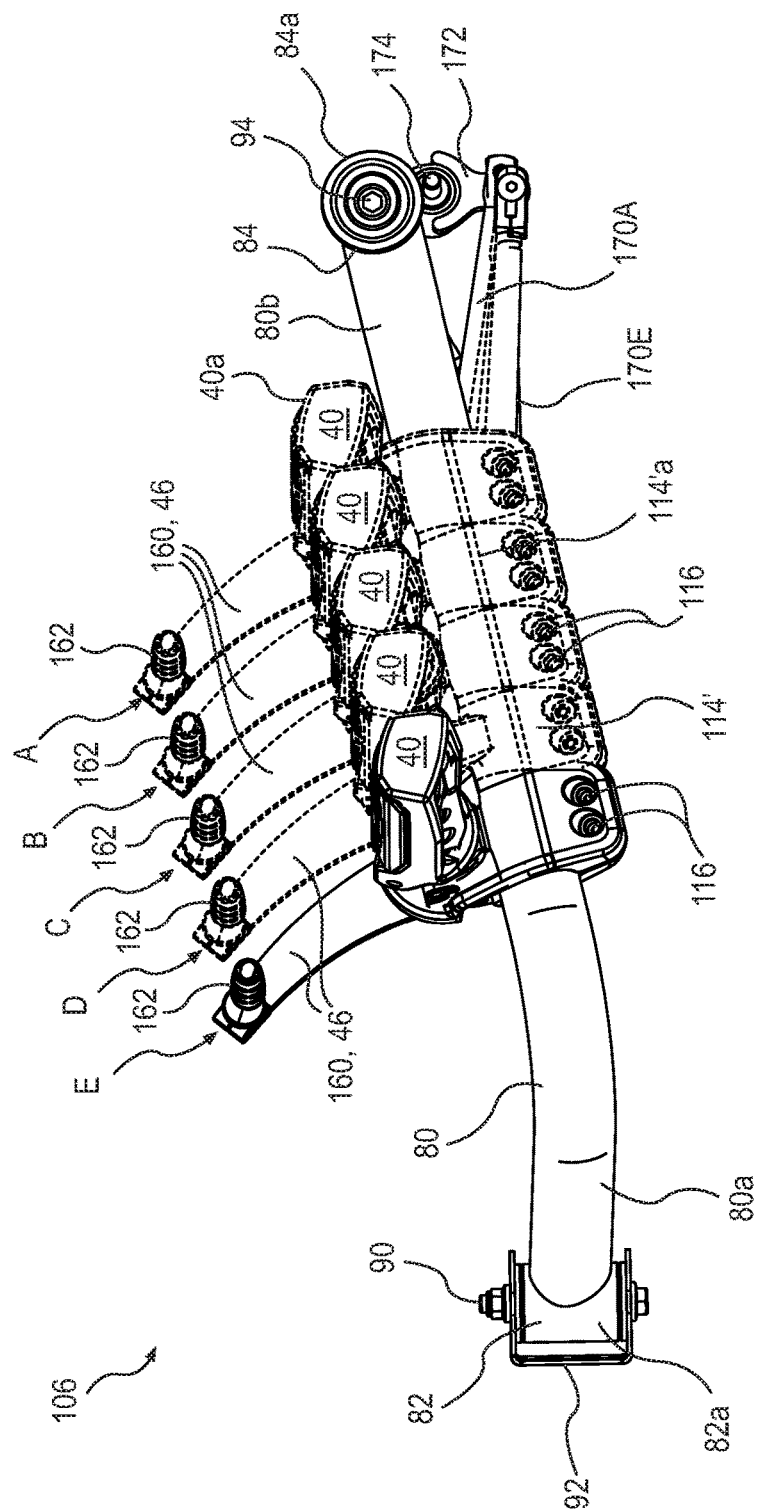
FIG. 10A is a left side elevation view of the left footrest assembly mounted to the left rail in five different positions.
Figure 10C:
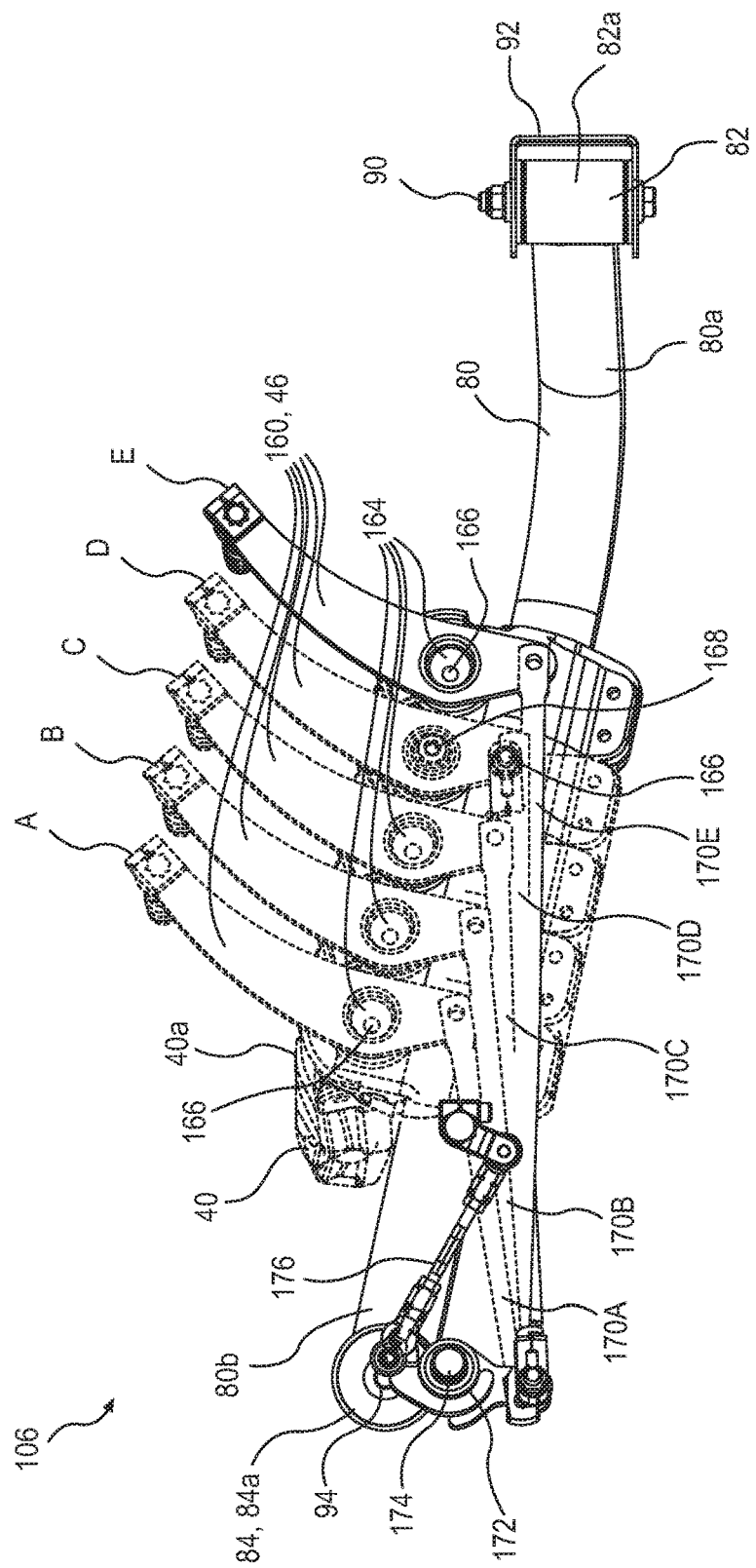
FIG. 10C is a right side elevation view of the left footrest assembly in various positions and left rail of FIG. 10A.

With reference now to FIGS. 10A to 10C, since the pin 174 is fixed with respect to the frame 12, when the position of the footrest assembly 106 along the rail 80 is changed, the linkage rod 170 connecting the gear shift actuator 46 to the link 172 has to be changed accordingly.

FIGS. 10A to 10C show the left footrest assembly 106 disposed in five different positions A to E along the left rail 80. Each of the positions A to E corresponds to the tab 118 of the clamp 114 being disposed in one of the rail openings 86. The position A is the rearwardmost and the position E is the forwardmost of the positions A to E. The position A of FIGS. 10A to 10C is similar to the rearward position A of the footrest 40 in FIGS. 6A to 6D. The position E of FIGS. 10A to 10C is similar to the forward position E of the footrest 40 in FIGS. 6A to 6D.

The footrest assembly 106 is mounted to the rear portion 80b of the left rail 80 which extends forwardly, leftwardly, and downwardly from the rear end 84. Therefore, the footpeg 40 moves forwardly and downwardly and laterally outwardly as the footrest assembly 106 is moved from the position A to the position E. The footrest assembly 106 is disposed closest to the pin 174 in position A and farthest from the pin 174 in position E.

Therefore, as can be seen best in FIG. 10C, linkage rods 170A, 170B, 170C, 170D and 170E having progressively greater lengths are used respectively in positions A, B, C, D and E to connect the gear shift actuator 46 to the link 172. The linkage rod 170A used in position A of the footrest assembly 106 is the shortest of the linkage rods 170A-E, and the linkage rod 170E used in position E of the footrest assembly 106 is the longest of the linkage rods 170A-E.

In the illustrated implementation of the vehicle 10, the linkage rod 170 is replaced with a different linkage rod 170 having a length appropriate for the new position of the footrest assembly 106. It is contemplated that the location of the connection between the linkage rod 170 and the link 172 could be moved instead of replacing the linkage rod 170. For example, the link 172 could have a longitudinally extending portion configured for attachment of the linkage rod 170 at different positions therealong. In this case, when the left footrest assembly 106 is moved to a new position along the left rail 80, the rear end of the linkage rod 170 will be moved to a new position on the longitudinally extending portion of the link 172.

Similarly, the right footrest assembly 104 can also be disposed in any one of five different positions A, B, C, D and E along the right rail 80. The positions A to E of the right footrest assembly 104 are longitudinally and vertically aligned respectively with the positions A to E of the left footrest assembly 106. Thus, the position A is forwardmost and the position E is the rearwardmost of the positions A to E of the right footrest assembly 104. FIGS. 8A to 8F show the right footrest assembly 104 being disposed in a position D. Different linkage rods 140A, 140B, 140C, 140D and 140E (not shown), having progressively greater lengths, are used respectively in positions A, B, C, D and E to connect to connect the brake actuator 44 to the link 142.

The footrest assemblies 104, 106 are positioned so as to comfortably accommodate different sizes of drivers and/or the driver's preferences. Therefore, for a relatively taller driver such as the one shown in FIGS. 11A to 11D, the footrest assemblies may be placed in one of the forward positions D or E.

In the illustrated implementation of the vehicle 10, as mentioned above, the openings 86 of the left rail are longitudinally and vertically aligned with corresponding right rail openings 86. It is intended that the left and right footrest assemblies 106, 104 will be disposed in longitudinally and vertically aligned positions (i.e. the tabs 118 of the left and right clamps 112 will be placed in longitudinally and vertically aligned openings 86 of the left and right rails 80). However, it will be understood that a user may choose to position the left footrest assembly 106 in a position where it is not longitudinally and vertically aligned with the right footrest assembly 104.

Figure 13:
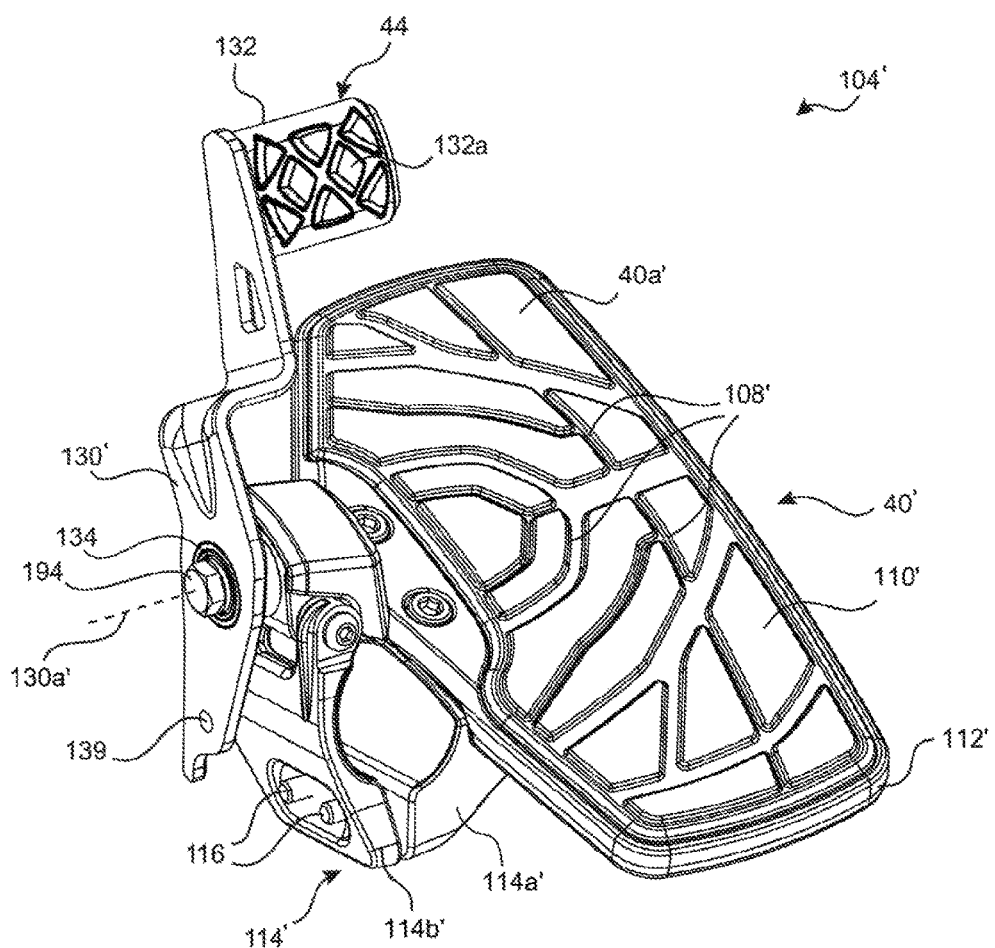
FIG. 13 is a perspective view, taken from a rear and left side, of a footrest and brake actuator of a right footrest assembly according to another implementation.
Figure 14B:
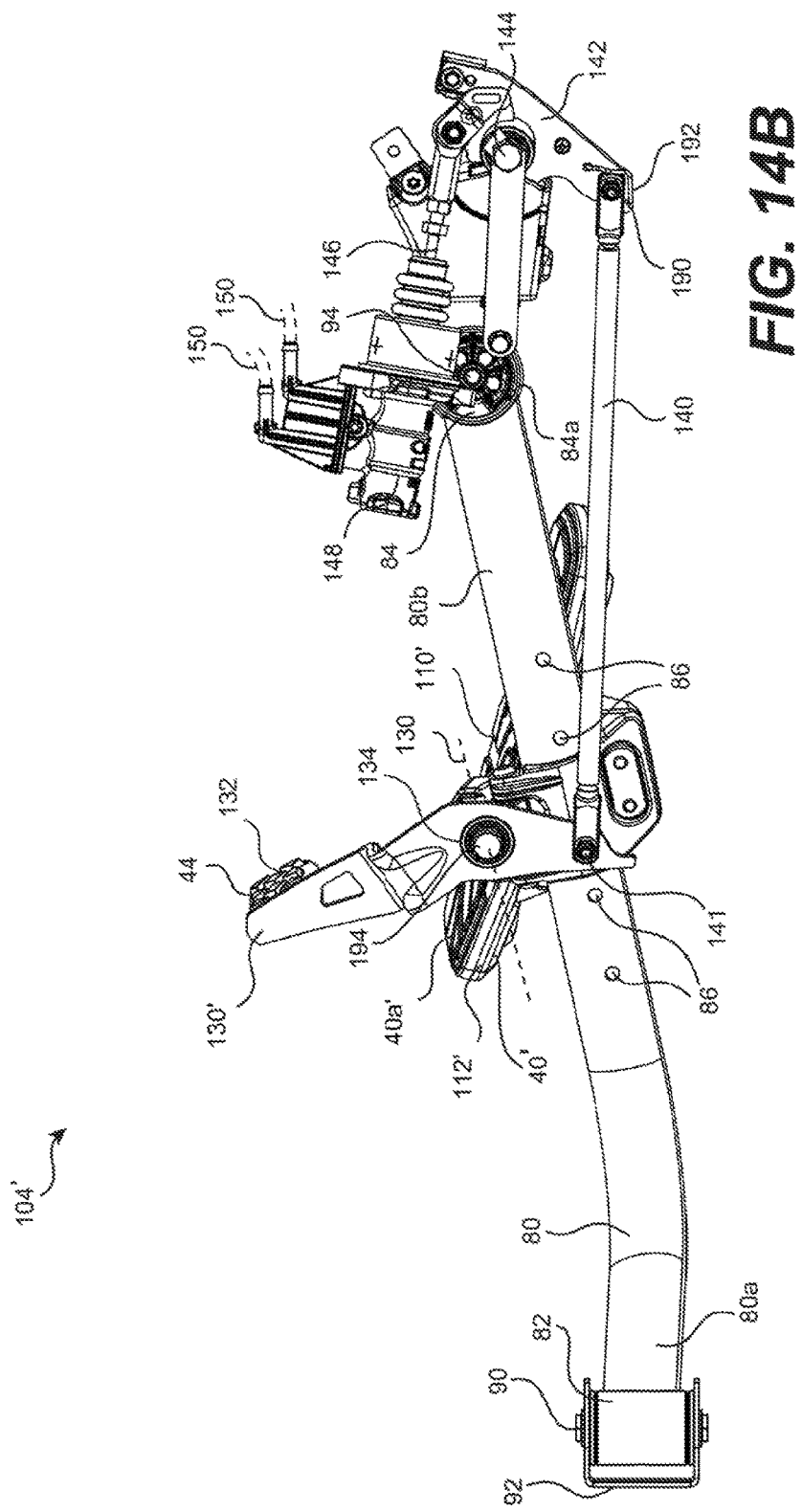
FIG. 14B is a left side elevation view of the right footrest assembly and right rail of FIG. 14A.

FIGS. 13 to 14B show another implementation of a right footrest assembly 104' that is similar to the right footrest assembly 104 discussed above with reference to FIGS. 7A to 8F. Features of the right footrest assembly 104' that are similar to corresponding features of the right footrest assembly 104 have been labeled with the same reference numbers and will not be discussed again herein in detail. Features of the right footrest assembly 104' that differ from corresponding features of the right footrest assembly 104 have been labeled with the same reference numbers followed by an apostrophe.

With reference to FIGS. 13 to 14B, the right footrest assembly 104' has a footrest 40' in the form of a footboard, the brake actuator 44 and a right clamp 114' for connecting the right footboard 40 to the right rail 80.

As best seen in FIG. 13, the footboard 40' is generally rectangular in shape. The footboard 40' has a length that is greater than its width. The upper surface 40a' of the footboard 40' is generally flat and has several grooves 108' to provide grip between the driver's foot and the footboard 40'. The grooves 108' are formed in a grip member 110' which is held in a complementary slot formed in a grip holder 112'. It is contemplated that the grip member 110' could be formed integrally with the holder 112'. It is also contemplated that the grooves 108' could be omitted from the upper surface 40a' of the footboard 40'. It is contemplated that the footboard 40' could be configured differently than as shown herein.

The right clamp 114' of the footrest assembly 104' is generally similar to the right clamp 114 of the footrest assembly 104, except that the clamp 114' extends longer in the longitudinal direction than the clamp 114 for supporting the footboard 40' which is longer than the footpeg 40. The right clamp 114' is connected to the left (inner) edge of the right footboard 40'. The right clamp 114' is disposed between the front and rear edges of the footboard 40'. The front edge of the clamp 114' is closer to the front edge of the footboard 40' than the rear edge of the clamp 114' is to the rear edge of the footboard 40'. It is contemplated that the clamp 114' could be configured differently than as shown herein.

With reference to FIGS. 14A and 14B, the right footboard 40' is mounted to the right rail 80 that is similar to the rail 80 discussed above and shown in FIGS. 1 to 12. The right rail 80 has five openings 86 in its inner surface as can be seen in FIG. 14B (four of the five openings 86 can be seen). The right clamp 114 retains the right footboard 40' at one of five positions A to E, each position corresponding to one of the openings 86. The right footboard 40' is shown mounted to the right rail 80 in a middle position C (hence the middle opening 86 is not seen in this Figure). The right footboard 40' can be positioned in positions A and B (not shown) rearward of the position C of FIGS. 14A and 14B, as well as in positions D and E (not shown) forward thereof. It is contemplated that the footboard 40' could be mounted to the rail 80 at different positions than as shown herein.

As can be seen in FIGS. 14A and 14B, the right footboard 40' is mounted at an angle to a horizontally extending plane such that the front edge of the footboard is disposed higher than the rear edge thereof. The footboard 40' is also disposed at an angle with respect to the rail portion 80b to which the footboard is mounted. The portion of the right rail 80 longitudinally aligned with the front edge of the right footboard 40' is disposed vertically lower than the front edge of the right footboard 40'. The portion of the right rail 80 longitudinally aligned with the rear edge of the right footboard 40' is disposed vertically higher than the rear edge of the right footboard 40'. In the illustrated implementation of the right footrest assembly 104', the front edge of the right footboard 40' is disposed longitudinally rearward of the forward end 82 of the right rail 80 in all positions A to E. In the illustrated implementation of the right footrest assembly 104', the rear edge of the footboard 40' is disposed longitudinally forward of the rear end 84 of the right rail 80 in the positions B to E. It is however contemplated that the footboard 40' could be sized and/or positioned differently than as shown herein with respect to the rail 80. It is also contemplated that the footboard 40' could be positioned at a different angle with respect to the rail 80 than as shown herein. It is contemplated that the angular configuration of the footboard 40' with respect to the rail 80 could be adjustable. For example, the footboard 40' could be pivotably connected to the right clamp 114', and retained at different angular positions with respect to the rail 80.

With reference to FIG. 13, the brake actuator 44 of the right footrest assembly 104' includes a pivoting arm 130' and a pedal 132. The pedal 132 of the right footrest assembly 104' is disposed vertically above the footboard 40' and generally similar to the pedal 132 of the footrest assembly 104. As can be seen in FIGS. 14A and 14B, the front edge of the pedal 132 is generally longitudinally aligned with the front edge of the footboard 40' so that the pedal 132 can be pushed by a front portion of the driver's right foot while the rear portion of the driver's right foot is resting on the footboard 40'. The pivoting arm 130' has an upper portion to which the pedal 132 is connected and a lower portion which is pivotably connected to the left side (inner) surface of the right footrest 40'. Since the brake actuator 44 is connected to the footboard 40', the brake actuator 44 is moveable along with the footboard 40' when the footboard 40' is repositioned along the rail 80. The footrest assembly 104' is thus easily repositioned without the need for adjusting the position of the brake actuator 44 with respect to the footboard 40' when the footboard 40' is repositioned.

The pivoting arm 130' of the right footrest assembly 104' is generally similar to the pivoting arm 130 of the right footrest assembly 104. The groove 136 of the pivoting arm 130 has been omitted in the pivoting arm 130'. The wire retainer 138 of the right footboard assembly 104 has also been omitted in the right footboard assembly 104'. The front end of the linkage rod 140 of the right footrest assembly 104' is retained by a bolt 141 inserted through an opening 139 in the lower portion of the pivoting arm 130. With reference to FIGS. 14A and 14B, the rear end of the linkage rod 140 is connected to a link 142 by a nut 190 and a bolt 191. A wire retainer 192 engaging the head of the bolt 191 retains the bolt 191 (thereby securing the rear end of the linkage rod 140) even in the absence of the nut 190. The pivoting of the brake actuator 44 with respect to the footboard 40' causes actuation of the brakes 45 in a similar manner to that discussed above for the footrest assembly 104. As in the footrest assembly 104 discussed above, each position A to E of the footboard 40' along the rail 80 has a corresponding linkage rod 140 for operatively connecting the brake actuator 44 to the brake assembly 45. Thus, when the footboard 40' of the footrest assembly 104' is repositioned along the rail 80, the linkage rod 140 is replaced with the linkage rod 140 configured for that position.

Figure 15A:
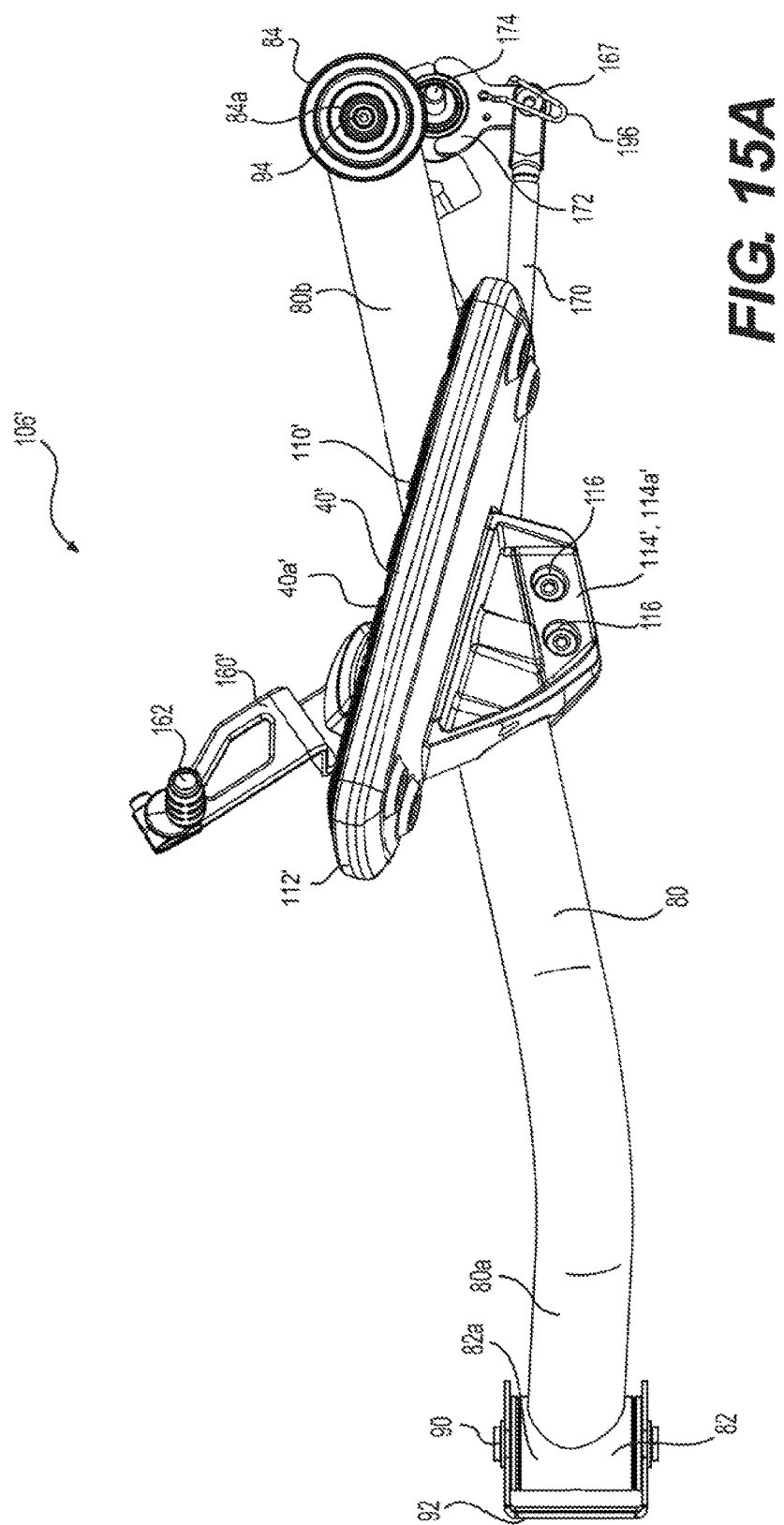
FIG. 15A is a left side elevation view of a left footrest assembly according to another implementation mounted to the left rail of the vehicle of FIG. 1.
Figure 15B:
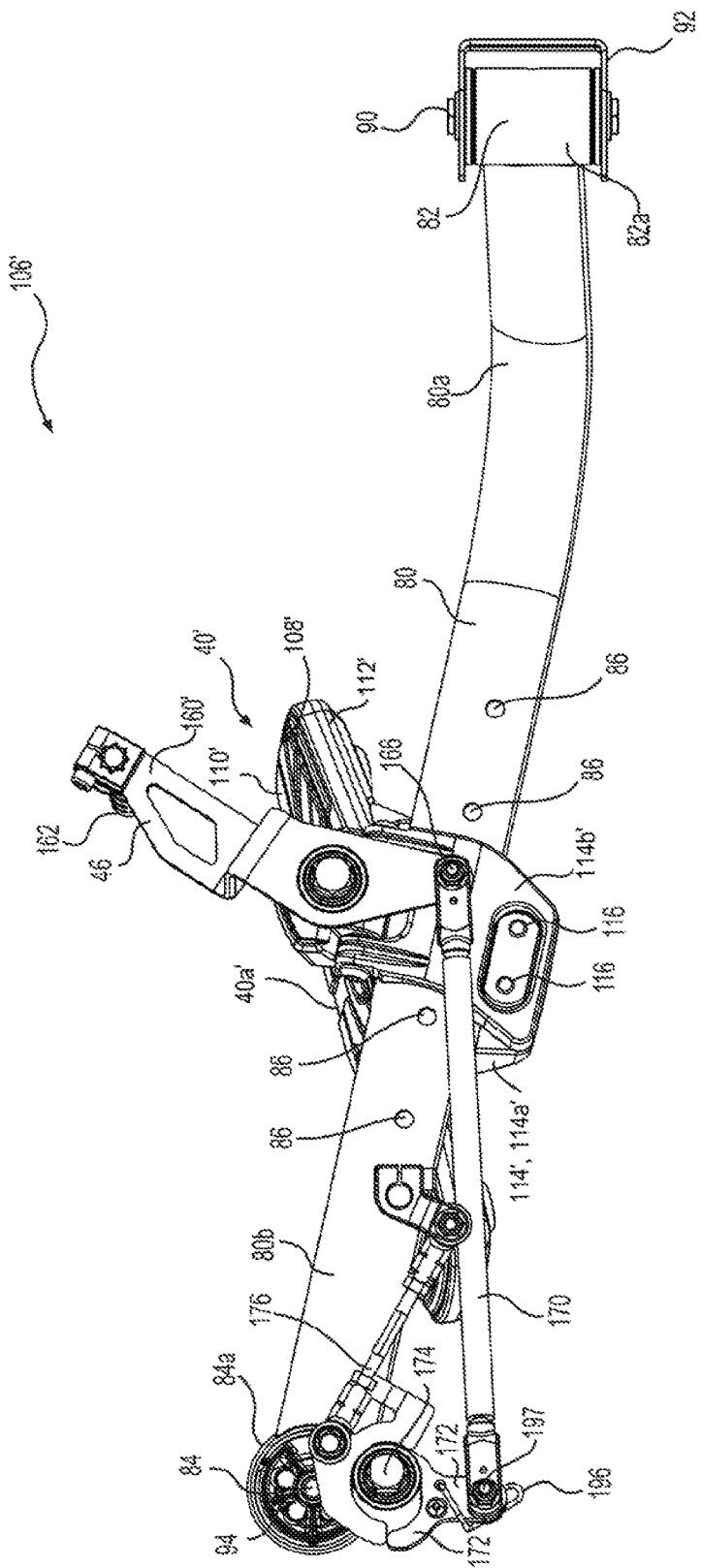
FIG. 15B is a right side elevation view of the left footrest assembly and left rail of FIG. 15A.

FIGS. 15A to 15B show another implementation of a left footrest assembly 106' that is similar to the left footrest assembly 106 discussed above with reference to FIGS. 9A to 9C. Features of the left footrest assembly 106' that are similar to corresponding features of the left footrest assembly 106 have been labeled with the same reference numbers and will not be discussed again herein in detail. Features of the left footrest assembly 106' that differ from corresponding features of the left footrest assembly 106 have been labeled with the same reference numbers followed by an apostrophe.

With reference to FIGS. 15A and 15B, the left footrest assembly 106' includes a left footrest 40', the gear shift actuator 46 and a left clamp 114' for connecting the left footrest 40' to the left rail 80. The left footboard 40' and left clamp 114' of the left footrest assembly 106' are mirror images respectively of the right footboard 40' and right clamp 114' of the right footrest assembly 104', and as such will not be described herein.

With reference to FIGS. 15A and 15B, the gear shift actuator 46 of the left footrest assembly 106' includes a pivoting arm 160 and a pedal 162. The pedal 162 of the left footrest assembly 106' is disposed vertically above the footboard 40' and generally similar to the pedal 162 of the footrest assembly 106. As can be seen in FIGS. 15A and 15B, the front edge of the pedal 162 is generally longitudinally aligned with the front edge of the footboard 40' so that the pedal 162 can be operated by a front portion of the driver's left foot while the rear portion of the driver's left foot is resting on the footboard 40'. The pivoting arm 162 has an upper portion to which pedal 162 is connected and a lower portion which is pivotably connected to the right side (inner) surface of the left footrest 40'. Since the gear shift actuator 46 is connected to the footboard 40', the gear shift actuator 46 is moveable along with the footboard 40' when the footboard 40' is repositioned along the rail 80. The footrest assembly 106' is thus easily repositioned without the need for adjusting the position of the gear shift actuator 46 with respect to the footboard 40' when the footboard 40' is repositioned.

The pivoting of the gear shift actuator 46 with respect to the footboard 40' causes actuation of the gear shift selector (not shown) in a similar manner to that discussed above for the footrest assembly 106. As in the footrest assembly 106 discussed above, each position A to E of the footboard 40' along the rail 80 has a corresponding linkage rod 170 for operatively connecting the gear shift actuator 46 to the gear selector. Thus, when the footboard 40' of the footrest assembly 106' is repositioned along the rail 80, the linkage rod 170 is replaced with the linkage rod 170 configured for that position. The rear end of the linkage rod 170 is fastened to the link 172 by a bolt 167 and a nut 197 as in the footrest assembly 106 of FIGS. 9A to 9C. In the footrest assembly 106', a wire retainer 196 engaging the head of the bolt 167 retain the bolt 167 in place (thereby securing the rear end of the linkage rod 170) even in the absence of the nut 197.

Modifications and improvements to the above-described implementations of the present vehicle may become apparent to those skilled in the art. The foregoing description is intended to be exemplary rather than limiting. The scope of the present technology is therefore intended to be limited solely by the scope of the appended claims.

What is claimed is:

1. A vehicle comprising:
   a frame defining a longitudinal centerplane of the vehicle;
   at least one front wheel connected to the frame;
   at least one rear wheel connected to the frame;
   an engine supported by the frame and operatively connected to at least one of the wheels;
   a transmission operatively connecting the engine to the at least one of the wheels;
   a brake assembly operatively connected to at least one of the wheels;
   a straddle seat connected to the frame;
   a left rail being connected to the frame and disposed vertically lower than the seat, the left rail extending forwardly and downwardly on a left side of the longitudinal centerplane;
   a right rail being connected to the frame and disposed vertically lower than the seat, the right rail extending forwardly and downwardly on a right side of the longitudinal centerplane;
   a left footrest being connected to the left rail and selectively disposed in one of at least a first left footrest position and a second left footrest position, the left rail being connected to the frame forwardly of the left footrest and rearwardly of the left footrest in each of the first and second left footrest positions;
   a right footrest being connected to the right rail and selectively disposed in one of at least a first right footrest position and a second right footrest position, the right rail being connected to the frame forwardly of the right footrest and rearwardly of the right footrest in each of the first and second right footrest positions;
   a foot-operated actuator being connected to one of the left footrest and the right footrest, the actuator being operatively connected to one of: the brake assembly and the transmission; and
   a linkage rod connecting the actuator to the one of the brake assembly and the transmission, the linkage rod being selected from a plurality of linkage rods including at least a first linkage rod and a second linkage rod,
     the first linkage rod being selected when the one of the left footrest and the right footrest is disposed in the corresponding one of the first left footrest position and first right footrest position; and
     the second linkage rod being selected when the one of the left footrest and the right footrest is disposed in the corresponding one of the second left footrest position and second right footrest position.

2. The vehicle of claim 1, wherein:
   the left rail extends forwardly, downwardly and leftwardly; and
   the right rail extends forwardly, downwardly and rightwardly.

3. The vehicle of claim 1, wherein:
   a front end of the left rail is disposed vertically lower than a rear end thereof; and
   a front end of the right rail is disposed vertically lower than a rear end thereof.

4. The vehicle of claim 1, wherein:
   a front end of the left rail is disposed laterally outwardly of a rear end thereof; and
   a front end of the right rail is disposed laterally outwardly of a rear end thereof.

5. The vehicle of claim 1, wherein:
   the left rail is connected to the frame below a rotation plane; and the right rail is connected to the frame below the rotation plane,
the rotation plane containing respective rotation axes of at least one of the at least one front wheel and at least one of the at least one rear wheel.

6. The vehicle of claim 1, wherein:
in each of the first and second left footrest positions, the left footrest extends leftwardly from the left rail; and
in each of the first and second right footrest positions, the right footrest extends rightwardly from the right rail.

7. The vehicle of claim 1, wherein:
the left footrest is displaceable leftwardly from the first left footrest position to the second left footrest position; and
the right footrest is displaceable rightwardly from the first right footrest position to the second right footrest position.

8. The vehicle of claim 1, wherein:
the left footrest is displaceable forwardly, leftwardly and downwardly from the first left footrest position to the second left footrest position; and
the right footrest is displaceable forwardly, rightwardly and downwardly from the first right footrest position to the second right footrest position.

9. The vehicle of claim 1, wherein:
a portion of the left footrest is disposed above a rotation plane in the first left footrest position and below the rotation plane in the second left footrest position; and
a portion of the right footrest is disposed above the rotation plane in the first right footrest position and below the rotation plane in the second right footrest position,
the rotation plane containing respective rotation axes of at least one of the at least one front wheel and at least one of the at least one rear wheel.

10. The vehicle of claim 1, further comprising a steering assembly comprising:
a steering column rotatably connected to the frame and operatively connected to at least one of the wheels for steering the vehicle; and
a handlebar connected to the steering column and selectively disposed in one of at least a first handlebar position and a second handlebar position, the handlebar including a left grip and a right grip,
wherein:
each of the left and right grips is displaceable longitudinally forwardly from the first handlebar position to the second handlebar position.

11. The vehicle of claim 1, wherein the engine has a crankshaft,
the left footrest being disposed longitudinally rearward of the crankshaft in at least one of the first and second left footrest positions; and
the right footrest being disposed longitudinally rearward of the crankshaft in at least one of the first and second right footrest positions.

12. The vehicle of claim 1, wherein:
the transmission has a transmission output shaft operatively connected to at least one of the wheels;
the left footrest is disposed longitudinally forward of the transmission output shaft in at least one of first and second left footrest positions; and
the right footrest is disposed longitudinally forward of the transmission output shaft in at least one of the first and second right footrest positions.

13. The vehicle of claim 1, wherein the at least one front wheel includes a left front wheel and a right front wheel, and when the vehicle is steered in a straight-ahead direction:
the left footrest is disposed laterally inwardly of a center of the left front wheel; and
the right footrest is disposed laterally inwardly of a center of the right front wheel.

14. The vehicle of claim 1, wherein the at least one front wheel includes a left front wheel and a right front wheel, and when the vehicle is steered in a straight-ahead direction:
the left footrest is disposed laterally between the longitudinal centerplane and the left front wheel; and
the right footrest is disposed laterally between the longitudinal centerplane and the right front wheel.

15. The vehicle of claim 1, wherein the at least one front wheel includes a left front wheel and a right front wheel, and when the vehicle is steered in a straight-ahead direction:
a front end of the left rail is disposed laterally inwardly of the left front wheel; and
a front end of the right rail is disposed laterally inwardly of the right front wheel.

16. The vehicle of claim 1, wherein:
the left footrest disposed in the first left footrest position is longitudinally aligned with the right footrest in the first right footrest position; and
the left footrest disposed in the second left footrest position is longitudinally aligned with the right footrest disposed in the second right footrest position.

17. The vehicle of claim 1, further comprising a left passenger footrest and a right passenger footrest connected to the frame, wherein:
the left passenger footrest is disposed longitudinally rearwardly and vertically higher than the left rail; and
the right passenger footrest is disposed longitudinally rearwardly and vertically higher than the right rail.

18. A vehicle comprising:
a frame defining a longitudinal centerplane of the vehicle;
at least one front wheel connected to the frame;
at least one rear wheel connected to the frame;
an engine supported by the frame and operatively connected to at least one of the wheels;
a transmission operatively connecting the engine to the at least one of the wheels;
a brake assembly operatively connected to at least one of the wheels;
a straddle seat connected to the frame;
a left rail being connected to the frame and disposed vertically lower than the seat, the left rail extending forwardly and downwardly on a left side of the longitudinal centerplane;
a right rail being connected to the frame and disposed vertically lower than the seat, the right rail extending forwardly and downwardly on a right side of the longitudinal centerplane;
a left footrest being connected to the left rail and selectively disposed in one of at least a first left footrest position and a second left footrest position;
a right footrest being connected to the right rail and selectively disposed in one of at least a first right footrest position and a second right footrest position;
a foot-operated actuator being connected to one of the left footrest and the right footrest, the actuator being operatively connected to one of: the brake assembly and the transmission;
a steering column rotatably connected to the frame and operatively connected to at least one of the wheels for steering the vehicle; and a handlebar connected to the steering column and selectively disposed in one of at least a first handlebar position and a second handlebar position, the handlebar including a left grip and a right grip, each of the left and right grips being displaceable longitudinally forwardly from the first handlebar position to the second handlebar position, when the handlebar is steered in a straight-ahead direction:

in the first handlebar position:
at least a portion of the left grip is disposed longitudinally rearward of the left footrest in the first and the second left footrest positions; and
at least a portion of the right grip is disposed longitudinally rearward of the right footrest in the first and the second right footrest positions;

and in the second handlebar position:
at least a portion of the left grip is disposed longitudinally forward of the left footrest in the first left footrest position and longitudinally rearward of the left footrest in the second left footrest position; and
at least a portion of the right grip is disposed longitudinally forward of the right footrest in the first right footrest position and longitudinally rearward of the right footrest in the second right footrest position.

19. A vehicle comprising:
a frame defining a longitudinal centerplane of the vehicle;
at least one front wheel connected to the frame;
at least one rear wheel connected to the frame;
an engine supported by the frame and operatively connected to at least one of the wheels;
a transmission operatively connecting the engine to the at least one of the wheels;
a brake assembly operatively connected to at least one of the wheels;
a straddle seat connected to the frame;
a left rail being connected to the frame and disposed vertically lower than the seat, the left rail extending forwardly and downwardly on a left side of the longitudinal centerplane;
a right rail being connected to the frame and disposed vertically lower than the seat, the right rail extending forwardly and downwardly on a right side of the longitudinal centerplane;
a left footrest being connected to the left rail and selectively disposed in one of at least a first left footrest position and a second left footrest position, the left footrest being displaceable leftwardly from the first left footrest position to the second left footrest position;
a right footrest being connected to the right rail and selectively disposed in one of at least a first right footrest position and a second right footrest position, the right footrest being displaceable rightwardly from the first right footrest position to the second right footrest position;
a foot-operated actuator being connected to one of the left footrest and the right footrest, the actuator being operatively connected to one of: the brake assembly and the transmission; and
a linkage rod connecting the actuator to the one of the brake assembly and the transmission, the linkage rod being selected from a plurality of linkage rods including at least a first linkage rod and a second linkage rod, the first linkage rod being selected when the one of the left footrest and the right footrest is disposed in the corresponding one of the first left footrest position and first right footrest position; and the second linkage rod being selected when the one of the left footrest and the right footrest is disposed in the corresponding one of the second left footrest position and second right footrest position.

* * * * *